(12) United States Patent
Oh et al.

(10) Patent No.: US 12,069,496 B2
(45) Date of Patent: Aug. 20, 2024

(54) METHOD AND APPARATUS FOR MONITORING RADIO LINK IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Hyunseok Ryu, Gyeonggi-do (KR); Sungjin Park, Gyeonggi-do (KR); Jonghyun Bang, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/572,256

(22) Filed: Jan. 10, 2022

(65) Prior Publication Data

US 2022/0132346 A1 Apr. 28, 2022

Related U.S. Application Data

(63) Continuation of application No. 16/586,329, filed on Sep. 27, 2019, now abandoned.

(30) Foreign Application Priority Data

Sep. 27, 2018 (KR) .................. 10-2018-0115351

(51) Int. Cl.
*H04W 24/08* (2009.01)
*H04L 5/00* (2006.01)
*H04W 56/00* (2009.01)

(52) U.S. Cl.
CPC ........... *H04W 24/08* (2013.01); *H04L 5/0048* (2013.01); *H04W 56/0005* (2013.01)

(58) Field of Classification Search
CPC .. H04W 24/08; H04W 56/0005; H04L 5/0048
See application file for complete search history.

(56) References Cited

U.S. PATENT DOCUMENTS 8,971,881 B2 3/2015 Nimbalker et al.
10,206,132 B2 2/2019 Park et al.
(Continued)

FOREIGN PATENT DOCUMENTS

CN 104303562 1/2015
CN 106465173 2/2017
(Continued)

OTHER PUBLICATIONS

English Translation of KR 20180093884, Aug. 10, 2018, pp. 1-72. (Year: 2018).*

(Continued)

*Primary Examiner* — Donald L Mills
(74) *Attorney, Agent, or Firm* — The Farrell Law Firm, P.C.

(57) ABSTRACT

A method performed by a user equipment (UE). The method including receiving radio link monitoring (RLM) configuration information from a base station; identifying a synchronization signal block (SSB) index included in the RLM configuration information; identifying, in a RLM-reference signal (RS) transmission duration, at least one candidate synchronization signal/physical broadcast channel (SS/PBCH) block circularly mapped on the SSB index, based on an index of the at least one of the candidate SS/PBCH block and a number of SSB identified according to subcarrier spacing; and performing RLM based on the at least one identified candidate SS/PBCH block.

16 Claims, 13 Drawing Sheets

(56) References Cited

U.S. PATENT DOCUMENTS

| | | | |
|---|---|---|---|
| 2017/0041112 A1 | 2/2017 | Kim et al. | |
| 2017/0223738 A1 | 8/2017 | Seo | |
| 2017/0238272 A1 | 8/2017 | You | |
| 2017/0311189 A1 | 10/2017 | Almalfouh | |
| 2018/0007574 A1 | 1/2018 | Park et al. | |
| 2018/0205526 A1 | 7/2018 | Kim | |
| 2019/0182691 A1 | 6/2019 | Wang et al. | |
| 2021/0028984 A1* | 1/2021 | Da Silva | H04L 5/0048 |
| 2021/0227568 A1* | 7/2021 | Harada | H04L 5/0048 |
| 2021/0297966 A1* | 9/2021 | Noh | H04L 5/0048 |
| 2021/0320833 A1* | 10/2021 | Kim | H04W 16/14 |
| 2023/0092255 A1* | 3/2023 | Noh | H04W 56/006 |

FOREIGN PATENT DOCUMENTS

| | | |
|---|---|---|
| CN | 107210826 | 9/2017 |
| CN | 107787005 | 3/2018 |
| EP | 3 148 245 | 3/2017 |
| KR | 2017/0017531 | 2/2017 |
| WO | WO 2017/189243 | 11/2017 |
| WO | WO 2018/038576 | 3/2018 |

OTHER PUBLICATIONS

Nokia et al., "Remaining Details on Beam Recovery", 3GPP TSG-RAN WG1 Meeting #93, Busan, Korea, May 21-25, 2018, R1-1807185, pp. 10.

Ericsson, "On initial access, RRM, mobility and RLM", 3GPP TSG-RAN WG1 Meeting #94, Gothenburg, Sweden, Aug. 20-24, 2018, R1-1809205, pp. 9.

Charter Communications, "SI Transmissionin NR-U", 3GPP TSG RAN WG1 Meeting #94, Gothenburg, Sweden, Aug. 20-25, 2018, R1-1809179, pp. 4.

Intel Corporation, "Summary of Office discussion for NR mobility", 3GPP TSG RAN WG1 Meeting #94, Gothenburg, Sweden, Aug. 20-24, 2018, R1-1809985, pp. 25.

European Search Report dated Nov. 26, 2021 issued on counterpart Application No. 19867826.0-1205, pp. 12.

Nokia et al., "RLM/RLF Measurement on NR-U", R2-1812309, 3GPP TSG-RAN WG2 Meeting #103, Aug. 20-24, 2018, 4 pages.

Fujitsu, "Link Reconfiguration and RLM/RLF", R2-1800314, 3GPP TSG-RAN WG2 NR Ad hoc 1801, Jan. 22-26, 2018, 5 pages.

International Search Report dated Feb. 5, 2020 issued in counterpart application No. PCT/KR2019/095035, 11 pages.

Indian Examination Report dated Jan. 18, 2023 issued on counterpart Application No. 202137017494, 6 pages.

InterDigital Inc., "RLM/RLF for NR-U", R2-1811454, 3GPP TSG-RAN WG2 Meeting #103, Aug. 20-24, 2018, 3 pages.

Vivo, "Evaluation of the RLM for NR-U", R2-1810758, 3GPP TSG-RAN WG2 NR AH1807 Meeting, Jul. 2-6, 2018, 7 pages.

LG Electronics, "Initial Access and Mobility for NR Unlicensed Operation", R1-1808508, 3GPP TSG RAN WG1 Meeting #94, Aug. 20-24, 2018, 12 pages.

Chinese Office Action dated Nov. 24, 2023 issued on counterpart Application No. 201980064215.0, 14 pages.

Korean Office Action dated Oct. 30, 2023 issued on counterpart Application No. 10-2018-0115351, 6 pages.

Chinese Office Action dated May 8, 2024 issued on counterpart Application No. 201980064215.0, 7 pages.

* cited by examiner

METHOD AND APPARATUS FOR MONITORING RADIO LINK IN WIRELESS COMMUNICATION SYSTEM

CROSS-REFERENCE TO RELATED APPLICATION

This application is a Continuation Application of U.S. patent application Ser. No. 16/586,329, filed on Sep. 27, 2019, in the United States Patent and Trademark Office, which is based on and claims priority under 35 U.S.C. § 119 to Korean Patent Application No. 10-2018-0115351, filed on Sep. 27, 2018, in the Korean Intellectual Property Office, the disclosures of which are incorporated by reference herein in their entireties.

BACKGROUND

1. Field

The disclosure relates to a wireless communication system, and more particularly, to a method and apparatus for monitoring a radio link in a wireless communication system.

2. Description of Related Art

To meet increasing demand with respect to an increase in wireless data traffic after the commercialization of $4^{th}$ generation (4G) communication systems, efforts have been made to develop $5^{th}$ generation (5G) or pre-5G communication systems. For this reason, 5G or pre-5G communication systems are called "beyond 4G network" communication systems or "post long term evolution (post-LTE)" systems.

To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (COMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where people create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IIT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of Cloud-RAN as the above-described big data processing technology may be an example of convergence of 5G communication technology and IoT technology.

Because various services may be provided due to the aforementioned technical features and the development of wireless communication systems, methods for effectively providing these services are required.

SUMMARY

A method and apparatus for efficiently providing a service in a wireless communication system are provided.

According to an aspect of the present disclosure, a method performed by a user equipment (UE) includes receiving radio link monitoring (RLM) configuration information from a base station; identifying a synchronization signal block (SSB) index included in the RLM configuration information; identifying, in a RLM-reference signal (RS) transmission duration, at least one candidate synchronization signal/physical broadcast channel (SS/PBCH) block circularly mapped on the SSB index, based on an index of the at least one of the candidate SS/PBCH block and a number of SSB identified according to subcarrier spacing; and performing RLM based on the at least one identified candidate SS/PBCH block.

According to another aspect of the present disclosure, a method performed by a base station includes obtaining RLM configuration information including an SSB index; transmitting the RLM configuration information; and transmitting a plurality of candidate SS/PBCH blocks, in a configured RLM-RS transmission duration through an unlicensed band, wherein the plurality of candidate SS/PBCH blocks are circularly mapped on the SSB index, based on an index of the plurality of candidate SS/PBCH blocks and a number of SSB identified according to subcarrier spacing, and wherein RLM is performed based on at least one candidate SS/PBCH block identified at a user equipment among the plurality of candidate SS/PBCH blocks.

According to another aspect of the present disclosure, a UE includes a transceiver; and a processor configured to receive, via the transceiver, RLM configuration information from a base station, identify an SSB index included in the RLM configuration information, identify, in an RLM-RS transmission duration, at least one candidate SS/PBCH block circularly mapped on the SSB index, based on an index of the at least one candidate SS/PBCH block and a number of SSB identified according to subcarrier spacing, and perform RLM based on at least one identified candidate SS/PBCH block.

According to another aspect of the present disclosure, a base station for performing RLM in a wireless communication system includes a transceiver; and a processor configured to obtain RLM configuration information including an SSB index, transmit, via the transceiver, the RLM configuration information, and transmit, via the transceiver, a plurality of candidate SS/PBCH blocks, in a configured RLM-RS transmission duration through an unlicensed band, wherein the plurality of candidate SS/PBCH blocks are circularly mapped on the SSB index, based on an index of the plurality of candidate SS/PBCH blocks and a number of SSB identified according to subcarrier spacing, and wherein RLM is performed based on at least one candidate SS/PBCH block identified at a user equipment among the plurality of candidate SS/PBCH blocks.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
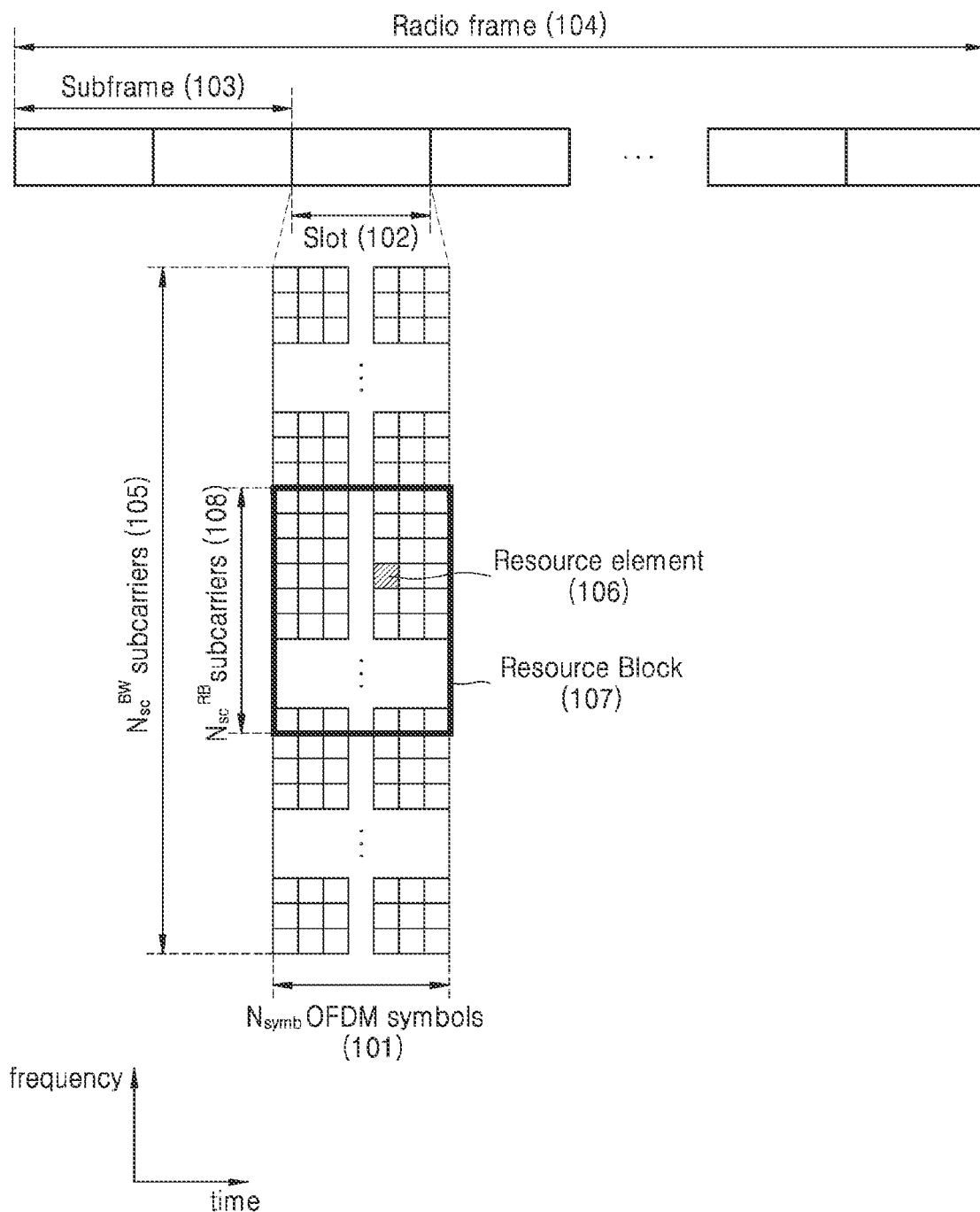
FIG. 1 is a diagram illustrating a transmission structure of a time-frequency domain that is a radio resource domain of a new radio (NR) system.

Embodiments of the present disclosure are described more fully below with reference to the accompanying drawings. In the following descriptions of the present disclosure, well-known functions or configurations are not described in detail because they would obscure the present disclosure with unnecessary details. The terms used in the present disclosure are defined in consideration of functions used in the present disclosure, but may be changed according to the intent or commonly used methods of users or operators. Accordingly, definitions of the terms are understood based on the entire descriptions of the present disclosure.

Advantages and features of the present disclosure and methods of accomplishing the same may be understood more readily by reference to the following detailed descriptions of embodiments and the accompanying drawings of the present disclosure. The present disclosure may, however, be embodied in many different forms and should not be construed as being limited to the embodiments set forth herein; rather, these embodiments of the present disclosure are provided so that the present disclosure is thorough and complete, and fully conveys the concept of the present disclosure to one of ordinary skill in the art. Therefore, the scope of the present disclosure is defined by the appended claims and their equivalents. Throughout the present disclosure, like reference numerals refer to like elements.

Embodiments of the present disclosure are described more fully below with reference to the accompanying drawings.

In the following description of embodiments of the present disclosure, descriptions of techniques that are well known in the art and not directly related to the present disclosure are omitted. This is to clearly convey the gist of the present disclosure by omitting unnecessary explanation.

For the same reason, some elements in the accompanying drawings are exaggerated, omitted, or schematically illustrated. In addition, the size of each element may not entirely reflect an actual size. In the accompanying drawings, the same or corresponding elements are denoted by the same reference numerals.

The advantages and features of the present disclosure and methods of achieving them will become apparent with reference to embodiments of the present disclosure described in detail below with reference to the accompanying drawings. The present disclosure may, however, be embodied in many different forms and should not be construed as limited to embodiments set forth herein; rather these embodiments are provided so that the present disclosure will be thorough and complete, and will fully convey the scope of the present disclosure as defined by the appended claims and their equivalents to one of ordinary skill in the art. In the present disclosure, the same elements are denoted by the same reference numerals.

It will be understood that each block of flowchart illustrations, and combinations of blocks in the flowchart illustrations, may be implemented by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. A unit may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and units may be combined into the smaller number of elements and units, or may be divided into additional elements and units. Furthermore, the elements and units may be embodied to reproduce one or more central processing units (CPUs) in a device or security multimedia card. In addition, in an embodiment of the present disclosure, the term "unit" may include at least one processor.

Throughout the present disclosure, the expression "at least one of a, b or c" indicates only a, only b, only c, both a and b, both a and c, both b and c, all of a, b, and c, or variations thereof.

In the present disclosure, a controller may also be referred to as a processor.

Throughout the present disclosure, a layer (or a layer apparatus) may also be referred to as an entity.

In a 5G system, as compared to an existing 4G system, supports for various services are considered. For example, the most representative services of the 5G system may include an enhanced mobile broad band (eMBB) service, an ultra-reliable and low latency communication (URLLC) service, a massive machine type communication (mMTC) service, an evolved multimedia broadcast/multicast service (eMBMS), or the like. However, the present disclosure is not limited thereto. A system that provides the URLLC service may be called an URLLC system, and a system that provides the eMBB service may be called an eMBB system. In this regard, the terms "service" and "system" may be used interchangeably.

In such a communication system, a plurality of services may be provided to a user, and, to provide the plurality of services to the user, there is a demand for a method and apparatus for providing each of the services in a same time interval according to features.

In a wireless communication system, e.g., long term evolution (LTE) or LTE-advanced (LTE-A) systems or 5G (or NR) system, a BS and a UE may be configured such that the BS transmits downlink control information (DCI) to the UE, where the DCI includes resource assignment information for transmission of a DL signal to be transmitted via a physical downlink control channel (PDCCH), and the UE receives at least one DL signal of the DCI (e.g., a channel-state information reference signal (CSI-RS)), a physical broadcast channel (PBCH), or a physical downlink shared channel (PDSCH).

For example, the BS may transmit, in a subframe n, DCI indicating the UE to receive the PDSCH in the subframe n via the PDCCH, and, upon reception of the DCI, the UE may receive the PDSCH in the subframe n, based on the received DCI.

In addition, in the LTE, LTE-A, or NR system, the BS and the UE may be configured such that the BS transmits DCI including UL resource assignment information to the UE via the PDCCH, and thus the UE transmits at least one UL signal of UL control information (UCI) (e.g., a sounding reference signal (SRS), UCI, or a physical random access channel (PRACH)) or a physical uplink shared channel (PUSCH) to the BS.

For example, the UE may receive, from the BS via the PDCCH, UL transmission configuration information (or UL DCI or UL grant) in a subframe n, and may perform UL data channel transmission (hereinafter, PUSCH transmission), according to a pre-defined time (e.g., n+4), a time configured by an upper signal (e.g., n+k), or UL signal transmission time indicator information included in the UL transmission configuration information.

In a case where configured DL transmission is transmitted from the BS to the UE via an unlicensed band, or configured UL transmission is transmitted from the UE to the BS via the unlicensed band, a transmission apparatus (the BS or the UE) may perform, before or immediately before a start of configured signal transmission, a channel access procedure or listen-before talk (LBT) on the unlicensed band where signal transmission is configured, and according to a result of performing the channel access procedure, when it is determined that the unlicensed band is in an idle state, the transmission apparatus may access the unlicensed band and then may perform the configured signal transmission.

According to the result of the channel access procedure performed by the transmission apparatus, when it is determined that the unlicensed band is not in the idle stat or is determined that the unlicensed band is in an occupied state, the transmission apparatus is not able to access the unlicensed band and thus may not be able to perform the configured signal transmission. In general, in the channel access procedure with respect to the unlicensed band where signal transmission is configured, the transmission apparatus may determine the idle state of the unlicensed band by receiving a signal in the unlicensed band during a predefined time or a time calculated according to a pre-defined rule (e.g., a time calculated using a random value selected by the BS or the UE), and then by comparing a strength of the received signal with a threshold value that is pre-defined or calculated by using a function of at least one parameter including a channel bandwidth, a bandwidth of a signal to be transferred, intensity of transmit power, a beamwidth of a transmission signal, or the like.

For example, when a strength of a signal received by the transmission apparatus during 25 μs is less than −72 dBm that is a pre-defined threshold, the transmission apparatus may determine that the unlicensed band is in the idle state and thus may perform the configured signal transmission. In this regard, a maximum available time of the signal transmission may be limited according to a maximum channel occupancy time in the unlicensed band defined according to each country or each region, or a type (e.g., the BS or the UE, or a master device or a slave device) of the transmission apparatus. For example, in Japan, the BS or the UE in 5 GHz of the unlicensed band may perform the channel access procedure and then may transmit, during maximum 4 ms, a signal by occupying a channel without additionally performing the channel access procedure. When the strength of the signal received by the transmission apparatus during 25 μs is greater than −72 dBm that is the pre-defined threshold, the BS may determine that the unlicensed band is not in the idle state and may not transmit a signal.

For the 5G communication system, various technologies may be introduced for providing various services and supporting a high data transmission rate, the various technologies including re-transmission in a code block group unit, transmission of an UL signal without UL scheduling information, or the like. Therefore, to perform 5G communication via the unlicensed band, a more efficient channel access procedure based on various parameters is required.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-A, and LTE-Pro of the 3GPP, high rate packet data (HRPD) and ultra mobile broadband (UMB) of 3GPP2, 802.16e of the Institute of Electrical and Electronic Engineers (IEEE), or the like. As a 5G wireless communication system, 5G or NR communication standards are being established.

In a wireless communication system including 5G, at least one of services including eMBB, mMTC, and URLLC may be provided to the UE. The services may be provided to a same UE during a same time interval. In an embodiment of the disclosure, the eMBB service may be for high-speed transmission of high-volume data, the mMTC service may be for minimization of power of a UE and accesses by multiple UEs, and the URLLC service may be for high reliability and low latency, but the present disclosure is not limited thereto. The three services may be primary services in an LTE system or a post-LTE system such as 5G or new radio/next radio (NR) system, but the present disclosure is not limited thereto.

Hereinafter, a BS is an entity that assigns resources of a UE, and may be at least one of an eNode B, a Node B, a BS, a wireless access unit, a BS controller, or a node on a network. Examples of a terminal may include a UE, a mobile station (MS), a cellular phone, a smartphone, a computer, a multimedia system capable of performing a communication function, or the like. As used herein, a DL refers to a transmission path of a wireless signal from a BS to a UE, and an UL refers to a transmission path of a wireless signal from a UE to a BS. Hereinafter, embodiments of the present disclosure are described with reference to an LTE or an LTE-A system as an example, and to describe a method and apparatus proposed in the present disclosure, terms of a physical channel and a signal in an existing LTE or LTE-A system may be used. The embodiments of the present disclosure are also applicable to other communication systems having a technical background or channel structure which is similar to that of the mobile communication system described in the present disclosure. For example, embodiments of the present disclosure are also applicable to 5G (or NR) communication systems developed after the LTE-A system. Embodiments of the present disclosure are also applicable to other communication systems through modification at the discretion of one of ordinary skill in the art without greatly departing from the scope of the present disclosure.

As a representative example of the broadband wireless communication system, the NR system has adopted an orthogonal frequency division multiplexing (OFDM) scheme in a DL and has adopted both the OFDM scheme and a single carrier frequency division multiple access (SC-FDMA) scheme in an UL. The multiple access scheme may distinguish between data and control information for each user by assigning and operating time-frequency resources on which the data or the control information is to be carried for each user, so that the time-frequency resources do not overlap each other, that is, so that orthogonality is established.

The NR system employs a HARQ scheme that retransmits data in a physical layer when decryption fails in initial transmission of the data. The HARQ scheme indicates that, when a receiver fails to accurately decrypt (e.g., decode) data, the receiver transmits information indicating a decoding failure, i.e., a negative acknowledgement (NACK), to a transmitter so as to allow the transmitter to retransmit the data in the physical layer. The receiver improves data reception performance by combining the data retransmitted by the transmitter with data that previously failed to be decoded. When the receiver accurately decoded the data, the receiver may transmit information indicating a decoding success, i.e., an acknowledgement (ACK), to the transmitter so as to allow the transmitter to transmit new data.

Hereinafter, the present disclosure provides a method and an apparatus for monitoring a radio link in an unlicensed band. In detail, the present disclosure provides, in a wireless communication system, in particular, in a system including a node to receive a DL signal through an unlicensed band or a node to transmit a UL signal through the unlicensed band, a method, performed by a reception node, of further accurately performing radio link state monitoring by determining whether a state of a radio link deteriorates due to a channel access process failure in a BS or a transmission node or due to deterioration in a quality of channel to the BS or the transmission node, and by excluding a case of the deterioration due to the channel access process failure in the BS or the transmission node, or by minimizing reflecting the case to radio link monitoring.

FIG. 1 is a diagram illustrating a transmission structure of a time-frequency domain that is a radio resource domain of an NR system.

Referring to FIG. 1, a horizontal axis represents a time domain and a vertical axis represents a frequency domain in the radio resource domain. A minimum transmission unit in the time domain may be an OFDM symbol or a discrete Fourier transform-spread-OFDM (DFT-s-OFDM) symbol, and $N_{symb}$ OFDM symbols or $N_{symb}$ DFT-s-OFDM symbols 101 may be gathered to constitute one slot 102. The OFDM symbol may be used to transmit and receive signals according to an OFDM multiplexing scheme, and the DFT-s-OFDM symbol may be used to transmit and receive signals according to a DFT-s-OFDM multiplexing scheme or a single carrier frequency division multiple access (SC-FDMA) multiplexing scheme. Hereinafter, the OFDM symbol and the DFT-s-OFDM symbol are not distinguished therebetween in embodiments of the present disclosure, and, thus, are collectively referred to as an OFDM symbol, and an embodiment of the present disclosure is described below with reference to reception and transmission of a DL signal, but may also be applied to an embodiment of reception and transmission of a UL signal.

When a spacing between subcarriers is 15 kHz, one slot 102 may constitute one subframe 103, and lengths of the slot 102 and the subframe 103 may each be 1 ms. The number of the slots 102 constituting one subframe 103, and a length of the slot 102 may vary according to a spacing between subcarriers. For example, when a spacing between subcarriers is 30 kHz, two slots 102 may constitute one subframe 103. In this case, a length of the slot 102 is 0.5 ms, and a length of the subframe 103 is 1 ms. A radio frame 104 may be a time domain duration composed of 10 subframes. A minimum transmission unit in the frequency domain is a subcarrier, and a bandwidth of a whole system transmission band is composed of $N_{sc}^{BW}$ subcarriers 105.

However, numerical values such as a spacing between subcarriers, the number of the slots 102 included in the subframe 103, a length of the slot 102, a length of the subframe 103, or the like may be variably applied. For example, in an LTE system, a spacing between subcarriers is 15 kHz, two slots 102 constitute one subframe 103, and, in this case, a length of the slot 102 is 0.5 ms and a length of the subframe 103 is 1 ms.

A basic unit of a resource in the time-frequency domain is a resource element (RE) 106 and may be expressed as a symbol index and a subcarrier index. A resource block (RB) or a physical resource block (PRB) 107 may be defined as $N_{symb}$ consecutive OFDM symbols 101 in the time domain and $N_{sc}^{RB}$ consecutive subcarriers 108 in the frequency domain. Therefore, one RB 107 in one slot may include RES=$N_{symb} \times N_{sc}^{RB}$. In general, a minimum data assignment unit of frequency domain is the RB 107. In the NR system, it may be typical that $N_{symb}=14$ and $N_{sc}^{RB}=12$, and the number ($N_{RB}$) of RBs may be changed based on a bandwidth of a system transmission band. In the LTE system, it may be typical that $N_{symb}=7$ and $N_{sc}^{RB}=12$, and $N_{RB}$ may be changed based on a bandwidth of a system transmission band.

DCI may be transmitted within a first N OFDM symbols in a subframe. In an embodiment of the present disclosure, N={1, 2, 3} in general, and a UE may be configured by a BS with respect to the number of symbols on which DCI is transmittable via an upper signal. In addition, based on the amount of control information to be transmitted in a current slot, the BS may change, for each slot, the number of symbols on which DCI is transmittable from a slot, and may transmit information about the number of symbols to the UE via a separate DL control channel.

In the NR or LTE system, scheduling information about DL data or UL data in DCI may be transmitted from the BS to the UE. The DCI may be defined in various formats, and may indicate, according to each format, whether the scheduling information is UL data scheduling information (UL grant) or DL data scheduling information (DL grant), whether the DCI is compact DCI having a small size of control information, whether the control information is fall-back DCI, whether spatial multiplexing using multiple antennas is applied, or whether the DCI is DCI for controlling power. For example, DCI format (e.g., DCI format 1_0 of NR) that is the scheduling control information (DL grant) of the DL data may include at least one of a plurality of pieces of control information below:

DCI format identifier: An identifier that identifies a format of received DCI
Frequency domain resource assignment: This indicates an RB assigned to data transmission.
Time domain resource assignment: This indicates a slot and a symbol that are assigned to data transmission.
Virtual resource block (VRB)-to-PRB mapping: This indicates whether to use a VRB mapping scheme.
Modulation and coding scheme (MCS): This indicates a modulation scheme used for data transmission and a size of a transport block (TB) that is data to be transmitted.
New data indicator: This indicates whether HARQ transmission is initial transmission or retransmission.
Redundancy version: This indicates a redundancy version of HARQ.
HARQ process number: This indicates a process number of HARQ.
PDSCH assignment information (DL assignment index): This indicates the UE to report the number of PDSCH receptions results to the BS.
Transmit power control (TPC) command for physical uplink control channel (PUCCH): This indicates a transmission power control command for a PUCCH that is a UL control channel.
PUCCH resource indicator: This indicates a PUCCH resource to be used in a HARQ-ACK report including a result of receiving a PDSCH set via corresponding DCI.
PUCCH transmission timing indicator (PDSCH-to-HARQ_feedback timing indicator): This indicates information about a slot or symbol on which a PUCCH is to be transmitted, wherein the PUCCH is for a HARQ-ACK report including a result of receiving a PDSCH set via corresponding DCI.

The DCI may be transmitted via a PDCCH (or control information, hereinafter, interchangeably used) that is a DL physical control channel or an enhanced PDCCH (EPDCCH) (or enhanced control information, hereinafter, interchangeably used) after passing through a channel coding and modulation process. Hereinafter, a technology of transmitting and receiving a PDCCH or an EPDCCH may be understood as DCI transmission and reception through the PDCCH or the EPDCCH, and PDSCH transmission and reception may be understood as DL data transmission and reception through a PDSCH.

In general, the DCI is scrambled by a specific radio network temporary identifier (RNTI) or UE identifier (C-RNTI) independently with respect to each UE, is added with a cyclic redundancy check (CRC), is channel-coded, and then is configured as an independent PDCCH to be transmitted. In the time domain, the PDCCH is mapped and transmitted for the control channel transmission duration. A mapping location of the PDCCH in the frequency domain may be determined by an identifier (ID) of each UE, and the PDCCH may be transmitted through a transmission bandwidth of a whole system.

The DL data may be transmitted through a PDSCH that is a physical channel for transmitting the DL data. The PDSCH may be transmitted after the control channel transmission duration, and scheduling information, such as a specific mapping location or a modulation scheme in the frequency domain, may be determined based on the DCI to be transmitted via the PDCCH.

The BS may notify the UE of a modulation scheme applied to the PDSCH to be transmitted and a transport block size (TBS) to be transmitted, by using an MCS included in the control information constituting the DCI. The MCS may be composed of 5 bits or may be composed of greater or fewer bits than 5 bits. The TBS corresponds to a size of the BS before channel coding for error correction is applied to the TB to be transmitted by the BS.

The modulation scheme supported in the NR system is quadrature phase shift keying (QPSK), 16 quadrature amplitude modulation (16QAM), 64QAM, or 256QAM, and respective modulation orders (Qm) correspond to 2, 4, and 6. That is, in a case of the QPSK modulation, 2 bits per symbol may be transmitted, in a case of the 16OQAM modulation, 4 bits per symbol may be transmitted, in a case of the 64QAM modulation, 6 bits per symbol may be transmitted, and in a case of the 256QAM modulation, 8 bits per symbol may be transmitted. In addition, a modulation scheme of 256QAM or more may be used according to system modification.

In the NR system, UL/DL HARQ adapts an asynchronous HARQ scheme in which data re-transmission time is not fixed. Describing an example of a DL, when the HARQ NACK is fed back from the UE with respect to the initially-transmitted data transmitted by the BS, the BS may freely determine, through the scheduling operation, transmission time of data to be retransmitted. The UE may buffer data that is determined as an error as a result of decoding the received data for the HARQ operation, and then may combine the buffered data with the data retransmitted from the BS. HARQ ACK/NACK information of the PDSCH transmitted in a subframe n-k may be transmitted from the UE to the BS via the PUCCH or the PUSCH in a subframe n.

In the 5G communication system such as the NR system, a k value may be included in DCI for indicating or scheduling reception of the PDSCH transmitted in the subframe n-k and then transmitted, or may be configured in the UE based on an upper signal. In this regard, the BS may configure one or more k values as the upper signal, and may indicate a specific k value by using the DCI. In this regard, k may be determined based on HARQ-ACK processing capacity of the UE, i.e., a minimum time required for the UE to receive the PDSCH and then to generate and report HARQ-ACK with respect to the PDSCH. In addition, before the k value is configured in the UE, the UE may use a predefined value or a default value.

The descriptions about the wireless communication system and the method and apparatus provided by an embodiment of the present disclosure are provided with respect to the NR system, but the present disclosure is not limited to the NR system and thus may be applied to various wireless communication systems including LTE, LTE-A, LTE-A-Pro, and 5G systems. In addition, the descriptions of the present disclosure are provided with reference to a system and apparatus that transmit and receive signals by using the unlicensed band, but the descriptions of the present disclosure may also be applicable to a system that operates in a licensed band.

Hereinafter, in the present disclosure, upper signaling or an upper signal may be a signal transmitting method by which the BS transmits a signal to the UE by using a DL data channel of a physical layer, or the UE transmits a signal to the BS by using an UL data channel of a physical layer, and may indicate a method by which a signal is transmitted by upper signaling (or the upper signal) including radio access control (RRC) signaling or PDCP signaling, or a medium access control element (MAC CE)). In addition, the upper signaling or the upper signal may include system information, e.g., system information block (SIB), which is commonly transmitted to a plurality of UEs.

In a system that performs communication in an unlicensed band, a transmission apparatus (e.g., the BS or the UE) to transmit a signal via the unlicensed band may perform, before signal transmission, a channel access procedure or LBT on the unlicensed band that is a communication target, and when it is determined that the unlicensed band is in an idle state according to a result of the channel access procedure, the transmission apparatus may access the unlicensed band and may perform the signal transmission. According to the result of the channel access procedure, when it is determined that the unlicensed band is not in the idle stat, the transmission apparatus may not be able to perform the signal transmission.

The channel access procedure with respect to the unlicensed band may be broadly divided into two types according to whether a channel access procedure start time is fixed (frame-based equipment (FBE)) or variable (load-based equipment (LBE)). In this regard, it is possible to determine whether the transmission apparatus is a FBE apparatus or a LBE apparatus, according to whether a transmit/receive structure of the transmission apparatus has one period or does not have a period, as well as the channel access procedure start time. Here, indication that the channel access procedure start time is fixed means that the channel access procedure of the transmission apparatus may periodically start according to a predefined period or a period declared or configured by the transmission apparatus. The indication may also indicate that the transmit/receive structure of the transmission apparatus has one period. Here, indication that the channel access procedure start time is variable indicates that the channel access procedure start time of the transmission apparatus may be started at any time when the transmission apparatus attempts to transmit a signal through the unlicensed band. The indication may also indicate that the transmit/receive structure of the transmission apparatus does not have one period, and the channel access procedure may start when required.

Hereinafter, descriptions are provided with respect to a channel access procedure in a case where the channel access procedure start time of the transmission apparatus is variable (LBE) (hereinafter, referred to as the traffic-based channel access procedure or the channel access procedure).

In general, in the channel access procedure with respect to the unlicensed band, the transmission apparatus may determine the idle state of the unlicensed band by receiving a signal in the unlicensed band during a fixed time or a time calculated according to a pre-defined rule (e.g., a time calculated using a random value selected by the BS or the UE), and then by comparing a strength of the received signal with a threshold value that is pre-defined or calculated by using a function of at least one parameter including a channel bandwidth, a bandwidth of a signal to be transferred, intensity of transmit power, a beamwidth of a transmission signal, or the like.

For example, the transmission apparatus may measure a strength of a signal for X μs (e.g., for 25 μs) immediately before a time to transmit the signal, and when the measured strength of the signal is less than a pre-defined or calculated threshold T (e.g., −72 dBm), the transmission apparatus may determine that the unlicensed band is in the idle state and thus may transmit a configured signal. In this regard, a maximum available time of consecutive signal transmissions after the channel access procedure may be limited according to a maximum channel occupancy time in the unlicensed band defined according to each country, each region, or each frequency band, or may be limited according to a type (e.g., the BS or the UE, or a master device or a slave device) of the transmission apparatus. For example, in Japan, the BS or the UE in 5 GHz of an unlicensed band may transmit, during maximum 4 ms, a signal by occupying a channel without additionally performing the channel access procedure on the unlicensed band that has been determined to be in the idle state according to a result of the channel access procedure.

In detail, when the BS or the UE attempts to transmit a DL signal or an UL signal via an unlicensed band, a channel access procedure that may be performed by the BS or the UE may be divided to types below:

Type 1: To perform the channel access procedure for a variable time and then transmit UL/DL signals Type 2: To perform the channel access procedure for a fixed time and then transmit UL/DL signals Type 3: To transmit a UL signal or a DL signal without performing the channel access procedure A transmission node (hereinafter, the BS or the UE) attempting to transmit a signal through the unlicensed band may determine a channel access procedure scheme according to a type of the signal to be transmitted. Hereinafter, in the present disclosure, it is assumed that the transmission node is the BS, and the transmission node and the BS may be used interchangeably.

For example, when the BS attempts to transmit a DL signal including a DL data channel through the unlicensed band, the BS may perform a Type-1 channel access procedure. When the BS attempts to transmit a DL signal not including a DL data channel through the unlicensed band, for example, when the BS attempts to transmit a synchronization signal or a DL control channel, the BS may perform a Type-2 channel access procedure, and may transmit the DL signal.

In this regard, the channel access procedure scheme may be determined according to a transmission length of the signal to be transmitted through the unlicensed band, or a length of a time or duration in which the unlicensed band is occupied and used. In general, the Type-1 scheme may require a channel access procedure to be performed longer than a channel access procedure based on the Type-2 scheme. Therefore, when to transmit a signal during short time duration or a time less than or equal to or less than a reference time (e.g., X ms or Y symbol), the Type-2 channel access procedure may be performed. However, when to transmit a signal during long time duration or a time greater than or equal to or greater than the reference time (e.g., X ms or Y symbol), the Type-1 channel access procedure may be performed. In other words, channel access procedures according to different types may be performed in an available time of the unlicensed band.

When performing the Type-1 channel access procedure based on the aforementioned references, the transmission node may determine a channel access priority class based on a quality of service class identifier (QCI) of the signal to be transmitted through the unlicensed band, and may perform the channel access procedure by using at least one value from among pre-defined configuration values as in Table 1 below, based on the determined channel access priority class. Table 1 below shows a mapping relation between channel access priority classes and QCIs.

For example, QCIs 1, 2, and 4 indicate QCI values of respective services such as Conversational Voice, Conversational Video (Live Streaming), and Non-Conversational Video (Buffered Streaming). When to transmit a signal through the unlicensed band, the signal being with respect to a service that does not match a QCI of Table 1 below, the transmission node may select the service, and a QCI of Table 1 below which is the most relevant to the service and may select a channel access priority class of the selected QCI.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

According to an embodiment of the present disclosure, defer duration, a group of values or sizes of a contention window (CW_p), a minimum value and a maximum value of the contention window (CW_min,p and CW_max,p), an available maximum channel occupancy time (T_mcot,p), or the like, based on the channel access priority class (p) may be determined according to Table 2 below. Table 2 below shows the aforementioned values according to the channel access priority classes in a DL.

In other words, when the BS attempts to transmit a DL signal through the unlicensed band, the BS performs the channel access procedure on the unlicensed band during a time=T_f+m_p*T_sl. When the BS attempts to perform the channel access procedure based on 3(p=3) as the channel access priority class, a value of defer duration which is required to perform the channel access procedure is set according to a formula that is T_f+m_p*T_sl (where m_p=3). In this regard, T_f is a value fixed as 16 μs, and a time of T_sl has to be an idle state, and in a time after the time of T_sl from among a time of T_f (i.e., the time of T_f-T_sl), the BS may not perform the channel access procedure. Even when the BS performed a channel access procedure in the time of T_f-T_sl, a result of the channel access procedure may not be used. In other words, the time of T_f-T_sl refers to a time in which the BS defers the performing of the channel access procedure.

When it is determined that the unlicensed band is in a constant idle state in a time of m_p*T_sl, it is possible that N=N-1. In this regard, N may be selected to be a random integer value between 0 to a contention window value (CW_p) at a point of time when the channel access procedure is performed. In a case of 3 of the channel access priority class, a minimum contention window value and a maximum contention window value are 15 and 63, respectively. When it is determined that the unlicensed band is in the idle state in defer duration and duration of an additional channel access procedure, the BS may transmit a signal during T_mcot,p time (8 ms). Table 2 below shows the channel access priority classes in the DL. The present disclosure is described by using DL channel access priority classes, but for a UL, the channel access priority classes of Table 2 below may be re-used or channel access priority classes may be defined for the UL and may be used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value (CW_p) is a minimum contention window value (CW_min,p). The BS that selected a value of N may perform the channel access procedure in a time of T_sl, and when the BS determines that the unlicensed band is in the idle state through the channel access procedure performed in the time of T_sl, the BS may change the value to N=N-1, and when N=0, the BS may transmit a signal during a maximum time of T_mcot,p through the unlicensed band. When the unlicensed band determined through the channel access procedure in the time of T_sl is not in the idle state, the value of N may not be changed and the channel access procedure may be performed again.

The contention window value (CW_p) may be changed or maintained based on a ratio (Z) of NACK in reception results (ACK/NACK) about DL data (received at a reference subframe or a reference slot), the results being transmitted or reported to the BS by one or more UEs that received the transmitted DL data at the reference subframe or the reference slot through a DL data channel. In this regard, the reference subframe or the reference slot may be defined as a point of time when the BS starts the channel access procedure, a point of time when the BS selects the value of N to perform the channel access procedure, or DL signal transmission duration (or MCOT) in which the BS most recently transmitted a DL signal through the unlicensed band immediately before the points of time.

Figure 2:
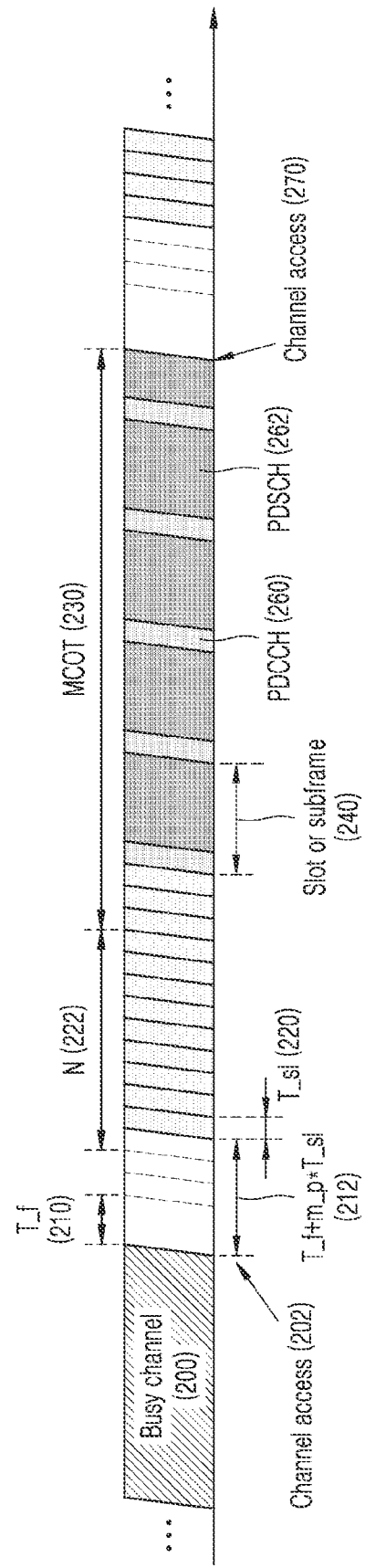
FIG. 2 is a diagram for describing a channel access procedure in an unlicensed band, according to an embodiment.

FIG. 2 is a diagram for describing a channel access procedure in the unlicensed band, according to an embodiment.

Referring to FIG. 2, a first slot or first subframe 240 may be defined as a reference slot or reference subframe, wherein the first slot or first subframe 240 is of DL signal transmission duration (a channel occupancy time (COT) (230)) in which the BS most recently transmitted a DL signal through the unlicensed band at a point of time when the BS starts a channel access procedure 270, a point of time when the BS selects a value of N to perform the channel access procedure, or immediately before the points of time. In detail, a subframe that is in an entire slot or subframe of the DL signal transmission duration and includes a first slot or subframe where a signal is transmitted may be defined as the reference slot or reference subframe. When the DL signal transmission duration starts after a first symbol of a slot or subframe, the slot or subframe in which DL signal transmission starts, and a first subframe of an entire subframe, wherein a signal is transmitted in the first subframe, may be defined as the reference slot or reference subframe. When a ratio of NACK in reception results about the DL data is equal to or greater than Z, the results being transmitted or reported to the BS by one or more UEs that received the transmitted DL data at the reference slot or reference subframe through a DL data channel, the BS may perform the channel access procedure 270 by determining a value or size of a contention window to be used in the channel access procedure 270 of the BS to be a secondly large contention window compared to a contention window used in a previous channel access procedure 202, in other words, the BS may perform the channel access procedure 270 by increasing the size of the contention window.

When the BS cannot receive a report of a reception result with respect to a DL data channel transmitted in the first slot or first subframe of the transmission duration 230, for example, when a time interval between a first subframe and a point of time when the BS starts the channel access procedure 270 is equal to or less than n slots or a subframe (in other words, when the BS starts the channel access procedure before a time when the UE can report the reception result with respect to the DL data channel transmitted in the first slot 240), a first subframe of a transmission duration in which a DL signal was most recently transmitted before the DL signal transmission duration 230 may become a reference subframe.

In other words, when the BS cannot receive, from the UE, a reception result about the DL data transmitted in the reference subframe 240 at the point of time when the BS starts the channel access procedure 270, the point of time when the BS selects the value of N to perform the channel access procedure, or immediately before the points of time, the BS may determine, as the reference subframe, a first subframe of transmission duration of a most-recently transmitted DL signal from among reception results about a DL data channel which were previously received from UEs. Then, the BS may determine a contention window size used in the channel access procedure 270, by using DL data reception results, which are received from the UEs, with respect to DL data transmitted via the DL data channel in the reference subframe.

For example, when the BS that transmitted a DL signal after a channel access procedure (e.g., CW_p=15) configured according to 3 of the channel access priority class (p=3) determines that 80% of reception results are NACK, the reception results being received from the UE with respect to DL data transmitted from the BS to the UE through the DL data channel in the first subframe, from among DL signals transmitted through the unlicensed band, the BS may increase the contention window value from an initial value (CW_p=15) to a next contention window value (CW_p=31).

In this regard, when the BS determines that at least 80% of the reception results are not NACK, the BS may maintain the contention window value as a current value or may change the contention window value to the initial contention window value. In this regard, a change in the contention window may be commonly applied to all of the channel access priority classes or may be applied to only a channel access priority class that was used in the channel access procedure. In this regard, provided is a method of determining a Z value, that is, a method, performed by the BS, of determining a reception result that is efficient in determining the contention window size in the reference subframe or the reference slot for determining whether to change the contention window size, the reception result being from among reception results that are about DL data that was transmitted via a DL data channel and are transmitted or reported to the BS, by the UE.

When the BS transmits one or more codewords or TBs to one or more UEs in the reference subframe or the reference slot, the BS may determine the Z value as a ratio of NACK in reception results transmitted or reported by the one or more UEs about TBs received in the reference subframe or the reference slot. For example, when two codewords or two TBs are transmitted to an UE in the reference subframe or the reference slot, the BS may receive transmission or two reports of DL data signal reception results about the two TBs from the UE. When a ratio of NACK (Z) in the two reception results is equal to or greater than a threshold value (e.g., Z=80%) that is pre-defined or set between the BS and the UE, the BS may change or increase the contention window size.

In this regard, when the UE performs bundling on DL data reception results about one or more subframes (e.g., M subframes) including the reference subframe or the reference slot, and transmits or reports a result thereof to the BS, the BS may determine that the UE has transmitted M reception results. Then, the BS may determine, as the Z value, a ratio of NACK in the M reception results, and may change, maintain, or initialize the contention window size.

When the reference subframe is a reception result about a second slot from among two slots constituting one subframe, the BS may determine, as the Z value, a ratio of NACK in a reception result, which the UE transmitted or reported to the BS, about DL data received in the reference subframe (in other words, the second slot) and a next subframe.

In addition, in a case where scheduling information or DL control information about a DL data channel to be transmitted by the BS is transmitted in a cell or a frequency band which is equal to a cell or a frequency band in which the DL data channel is transmitted, or a case where the scheduling information or the DL control information about the DL data channel to be transmitted by the BS is transmitted in the unlicensed band but is transmitted in a cell or a frequency band which is different from a cell or a frequency band in which the DL data channel is transmitted, when the BS determines that the UE did not transmit a reception result about DL data that the UE received in a the reference subframe or the reference slot, and when the BS determines that the reception result about the DL data, which is transmitted by the UE, is at least one of DTX, NACK/DTX, or any state, the BS may determine the reception result from the UE to be NACK and thus may determine the Z value.

Alternatively, in a case where the scheduling information or the DL control information about the DL data channel to be transmitted by the BS is transmitted in a licensed band, when the BS determines that a reception result about DL data, which is transmitted by the UE, is at least one of DTX, NACK/DTX, or any state, the BS may not include the reception result from the UE in the Z value that is a reference of the contention window value. In other words, the BS may determine the Z value while ignoring the reception result from the UE.

In addition, in a case where the scheduling information or the DL control information about the DL data channel is to be transmitted in the licensed band, when the BS actually does not transmit DL data (e.g., no transmission), the BS may ignore a DL data reception result that the UE transmitted or reported from among DL data reception results about the reference subframe or the reference slot, which the UE transmitted or reported to the BS, and may determine the Z value.

Hereinafter, a channel access procedure in a case where a channel access procedure start time of the transmission apparatus is fixed (FBE) (hereinafter, referred to as a frame-based channel access procedure or a channel access procedure) will now be described with reference to FIG. 3.

Figure 3:
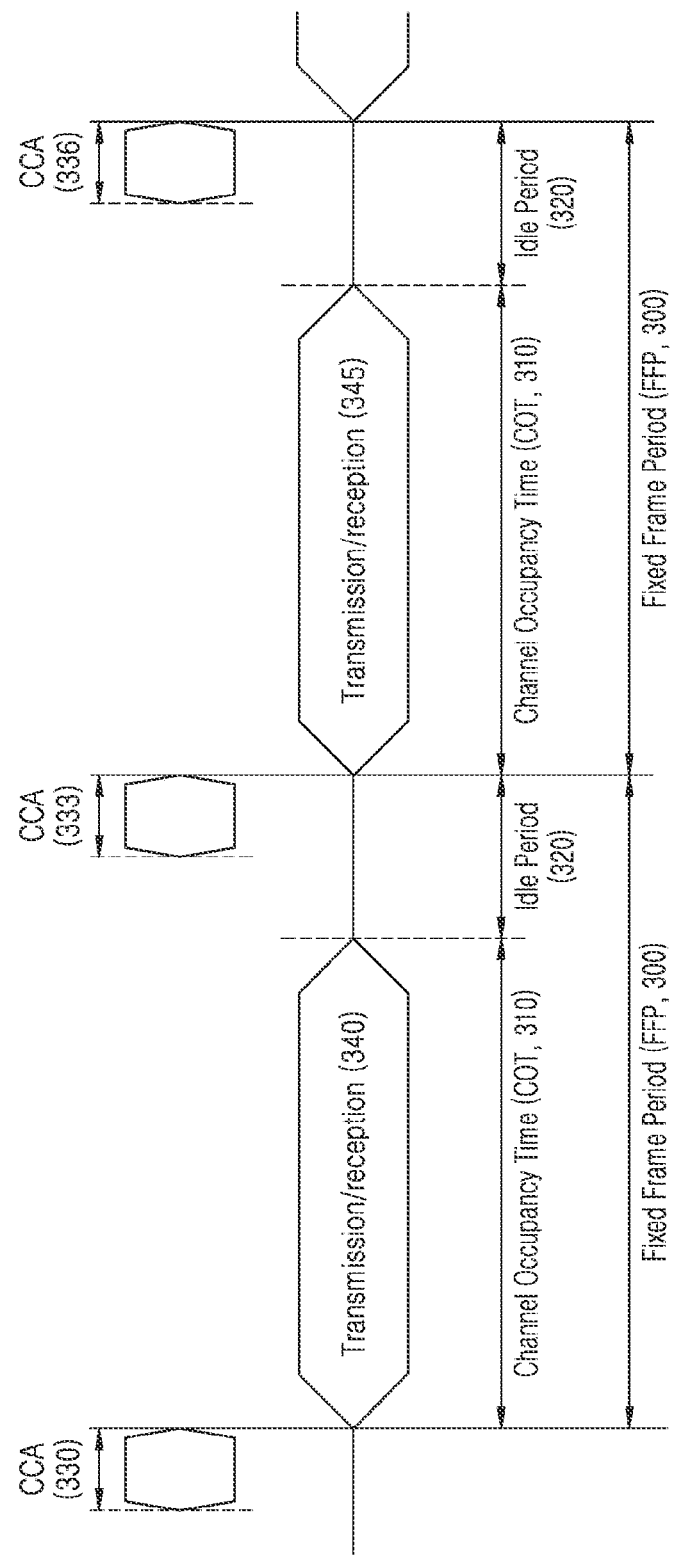
FIG. 3 is a diagram for describing a channel access procedure in an unlicensed band, according to an embodiment.

FIG. 3 is a diagram for describing a channel access procedure in the unlicensed band, according to an embodiment.

Referring to FIG. 3, an apparatus that performs a frame-based channel access procedure may periodically transmit and receive signals in a fixed frame period (FFP) 300. Here, the FFP 300 may be declared or configured by a transmission apparatus (e.g., a BS), and may be set between 1 ms and 10 ms. In this regard, a channel access procedure (or a clear channel access (CCA)) with respect to the unlicensed band may be performed in a gap 330, 333, or 336 immediately before a frame period starts, and may be performed during a fixed time as the Type 2 channel access procedure or one observation slot. When it is determined, as a result of the channel access procedure, that the unlicensed band is in an idle state or an idle channel, the transmission apparatus may transmit and receive signals for a time that is maximally 95% of the FFP 300 (hereinafter, the time is referred to as a COT 310), without performing an additional channel access procedure. Here, a time that is minimally 5% of the FFP 300 corresponds to an idle period 320 in which signals cannot be transmitted and received, and a channel access procedure may be performed in the idle period 320.

Compared to a traffic-based channel access procedure, it is relatively simple to perform a channel access procedure according to the frame-based channel access procedure, and is possible to periodically perform channel access to the unlicensed band. However, because a channel access procedure start time is fixed, a probability of successful access to the unlicensed band is low, compared to the traffic-based channel access procedure.

In the 5G communication system, it is required to flexibly define and operate a frame structure, in consideration of various services and requirements. For example, each of the services may have different subcarrier spacings depending on the requirements. In a current 5G communication system, to support a plurality of subcarrier spacings, the support may be determined by using Equation (1) below.

$$f = f_0 2^m \ldots \qquad (1)$$

In Equation (1) above, $f_0$ indicates default subcarrier spacing of a system, and m indicates a scaling factor that is an integer. For example, when $f_0$ is 15 kHz, a set of subcarrier intervals that the 5G communication system may have may be composed of 3.75 kHz, 7.5 kHz, 15 kHz, 30 kHz, 60 kHz, 120 kHz, 240 kHz, 480 kHz, or the like. An available set of subcarrier spacings may vary according to frequency bands. For example, in a frequency band less than or equal to 6 GHZ, 3.75 kHz, 7.5 KHz, 15 kHz, 30 KHz, and 60 KHz may be used, and in a frequency band greater than or equal to or greater than 6 GHZ, 60 KHz, 120 kHz, and 240 kHz may be used.

According to spacing between subcarriers constituting an OFDM symbol, a length of the OFDM symbol may vary. This is because, due to a characteristic of the OFDM symbol, the spacing between subcarriers and the length of the OFDM symbol have an inverse relation. For example, when the spacing between subcarriers is increased by twice, the length of the OFDM symbol is decreased by a half, and inversely, when the spacing between subcarriers is decreased by a half, the length of the OFDM symbol is increased by twice.

Figure 4:
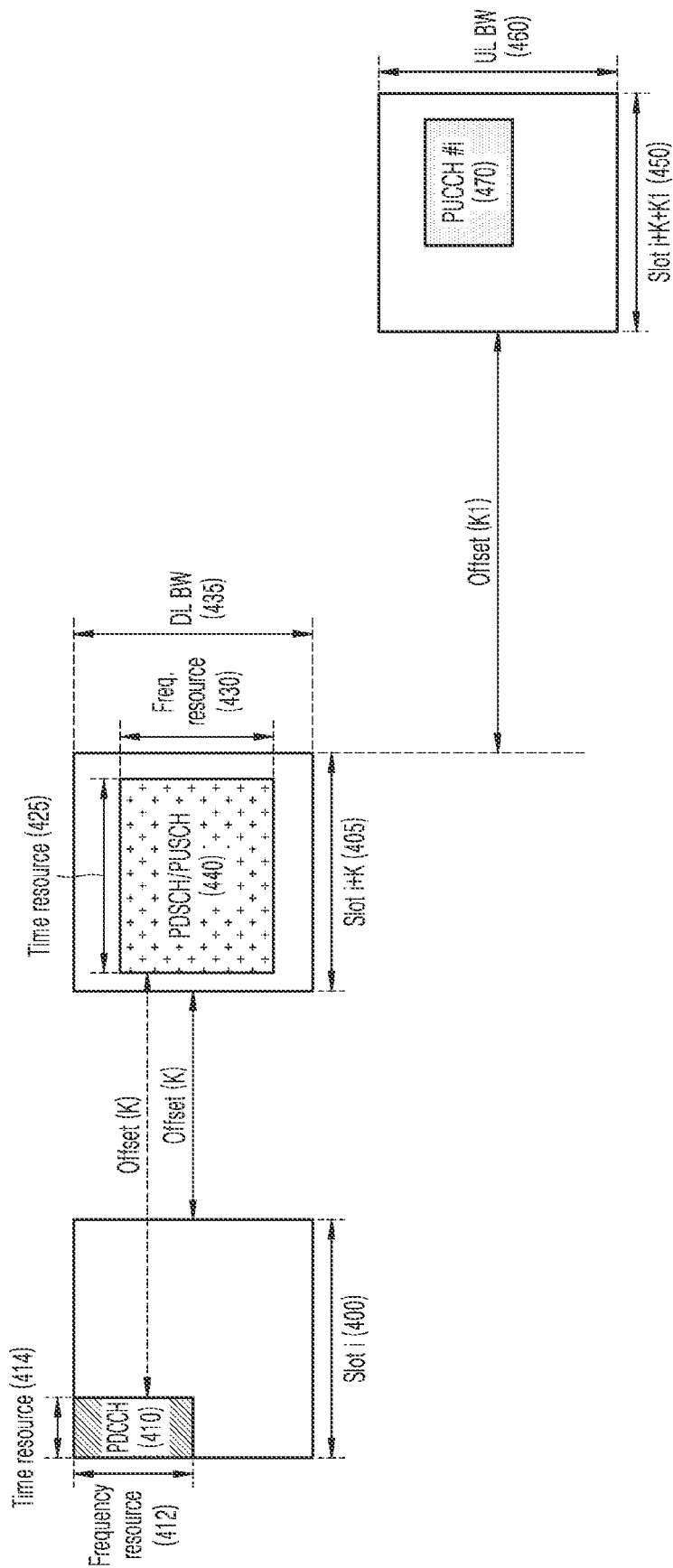
FIG. 4 illustrates downlink (DL) or uplink (UL) scheduling and a hybrid automatic repeat request (HARQ)-acknowledgement (ACK) feedback method therefor, and a resource region, in an NR system, according to an embodiment.

FIG. 4 illustrates DL or UL scheduling and a HARQ-ACK feedback method therefor, and a resource region, in an NR system, according to an embodiment.

Referring to FIG. 4, the resource region where a data channel is transmitted in a 5G or NR communication system are illustrated. The UE monitors or searches for a PDCCH 410 in a DL control channel region (hereinafter, a control resource set (CORESET) to a search space (SS)) configured according to an upper signal by the BS. In this regard, the DL control channel region is composed of time domain information 414 and frequency domain information 412, and the time domain information 414 may be configured according to a symbol unit, and the frequency domain information 412 may be configured according to an RB or an RB group.

When the UE detects the PDCCH 410 in a slot i 400, the UE obtains DCI transmitted via the detected PDCCH 410. The UE may obtain, based on the received DCI, scheduling information about a DL data channel or an UL data channel. In other words, the DCI may include information about a resource region (or a PDSCH transmission region) in which the UE is required to receive a DL data channel transmitted from the BS (hereinafter, a PDSCH), or information about a resource region that is assigned to the UE, by the BS, for transmission of a UL data channel (that is a PUSCH).

A case in which scheduling about transmission of an UL data channel (that is a PUSCH) is performed on the UE is described below. The UE that received DCI may determine, based on the DCI, a slot index or offset information K with respect to reception of the PUSCH, and may determine a PUSCH transmission slot index. For example, the UE may determine that the UE is scheduled to transmit the PUSCH in a slot i+K 405, based on the offset information K, according to the slot index i 400 where the PDCCH 410 is received. In this regard, the UE may also determine the slot i+K 405 or a symbol or time to initiate the PUSCH in the slot i+K 405, based on the offset information K, according to the received CORESET where the PDCCH 410 is received.

In addition, the UE may obtain, from the DCI, PUSCH transmission time-frequency resource region information 440 in a PUSCH transmission slot 405. The PUSCH transmission frequency resource region information 430 may include information about a PRB unit or a PRB group unit. The PUSCH transmission frequency resource region information 430 may be information about a region included in an initial bandwidth (BW) or an initial bandwidth part (BWP) that is determined by or is configured to the UE via an initial access procedure. When a BW or a BWP is configured to the UE by using an upper signal, the PUSCH transmission frequency resource region information 430 may be information about a region included in the BW or the BWP that is configured by using the upper signal.

The PUSCH transmission time resource region information 425 may be information about a symbol unit or a symbol group unit or may be information indicating absolute time information. The PUSCH transmission time resource region information 425 may be expressed as a PUSCH transmission start time, lengths of symbol and PUSCH, a PUSCH transmission end time, or a combination of symbols, and may be included as one field or one value in DCI. In this regard, the PUSCH transmission time resource region information 425 may be included, in the DCI, as fields or values respectively expressing the PUSCH transmission start time, the lengths of symbol and PUSCH, the PUSCH transmission end time, or each of the symbols. The UE may transmit the PUSCH in a PUSCH transmission time-frequency resource region information 440 determined based on the DCI.

Upon receipt of a PDSCH, the UE may feed back a reception result (e.g., HARQ-ACK) for the PDSCH to the BS. Here, the UE may determine a resource region of a UL control channel (i.e., a PUCCH 470), the resource region being for transmission of the reception result for the PDSCH, by using a PDSCH-to-HARQ timing indicator and a PUCCH resource indicator which are indicated by the DCI that schedules the PDSCH. In other words, after the UE receives K1 that is the PDSCH-to-HARQ timing indicator through the DCI, the UE may transmit a PUCCH 470 at a slot 450 after K1 starting from a slot 405 at which the PDSCH 440 is received. Here, the UE may perform PUCCH transmission through a resource indicated by the PUCCH resource indicator of the DCI, the resource being as a transmission resource for the PUCCH 470 at the slot 450 for PUCCH transmission. In this regard, when transmission of a plurality of PUCCHs is configured or indicated with respect to the slot 450 for PUCCH transmission, the UE may perform PUCCH transmission through a PUCCH resource other than the resource that is indicated by the PUCCH resource indicator of the DCI.

In the 5G communication system, to dynamically change a DL signal transmission period and an UL signal transmission period in a time division duplexing (TDD) system, the BS may indicate a slot format indicator (SFI) indicating whether each of OFDM symbols constituting one slot is a DL symbol, an UL symbol, or a flexible symbol. In this regard, a symbol indicates as the flexible symbol may be neither of the DL symbol and the UL symbol, or may be a symbol that is changeable to the DL symbol or the UL symbol according to UE-specified control information or scheduling information. In this regard, the flexible symbol may include a gap guard that is required in a change from a DL to an UL.

The SFI may be simultaneously transmitted to a plurality of UEs via a UE (cell) group common control channel. In other words, the SFI is transmitted via a PDCCH that is CRC scrambled by an identifier (e.g., a SFI-RNTI) different from a C-RNTI. The SFI may include information about N slots, and a value of N may be configured, by the BS, to the UE by using the upper signal, from among a set of values that are integers or natural numbers greater than 0, or pre-defined available values such as 1, 2, 5, 10, 20, or the like. In addition, a size of the SFI may be configured, by the BS, to the UE by using the upper signal. Examples of slot formats that may be indicated by the SFI are as shown in Table 3 below.

TABLE 3

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

TABLE 3-continued

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |
| 55 | D | D | X | U | U | U | D | X | U | U | U | U | U | U |
| 56 | D | D | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U | U |
| 61 | D | D | X | X | X | X | U | D | D | X | X | X | X | U |
| 62-254 | | | | | | | Reserved | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In Table 3 above, D refers to a DL, U refers to an UL, and X refers to a flexible symbol. In Table 3, the total number of supportable slot formats is 256. In a current NR system, a maximum size of an SFI information bit is 128 bits, and the SFI information bit may be configured, by the BS, to the UE by using the upper signal (e.g., dci-PayloadSize).

The SFI information may include slot formats about a plurality of serving cells, and the serving cells may be identified based on serving cell IDs. For each serving cell, a slot formation combination of SFIs with respect to one or more slots may be included. For example, when the SFI information bit has a size of 3 bits and is composed of an SFI about one serving cell, the SFI information of 3 bits may configure 8 SFIs or 8 slot format combinations (hereinafter, the SFI), and the BS may indicate one SFI from among the 8 SFIs by using UE group common DCI (hereinafter, SFI information).

At least one SFI from among the 8 SFIs may be configured as an SFI about a plurality of slots. For example, Table 4 below shows an example of 3-bit SFI information composed of slot formats of Table 3. Five (5) (slot format combination ID 0, 1, 2, 3, and 4) of the SFI information are SFIs about one slot, and three (3) (slot format combination ID 5, 6, and 7) of the SFI information are SFIs about four slots, which may be sequentially applied to the four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The UE may receive configuration information about a PDCCH for which SFI information is to be detected by using an upper signal, and may detect an SFI according to the configuration. For example, the UE may be configured, by the upper signal, with respect to a CORESET and a search space from which the SFI information is to be detected, RNTI information used in CRC scrambling on the DCI transmitting the SFI information, a period and offset information of the search space, or the like.

Figure 5:
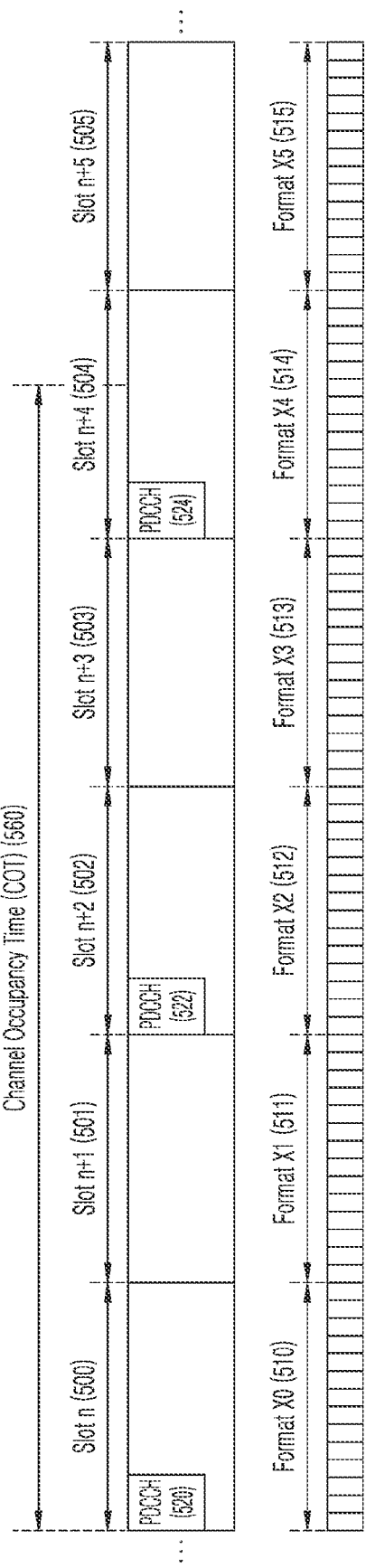
FIG. 5 is a diagram illustrating a channel occupancy time (COT), according to an embodiment.

FIG. 5 is a diagram illustrating a COT, according to an embodiment.

Referring to FIG. 5, PDCCH regions 520, 522, and 524 from which the UE is required to detect SFI information, and a period of the PDCCH regions 520, 522, and 524 is 2 slots are illustrated. In other words, the UE may detect DCI that is CRC scrambled by a SFI identifier (hereinafter, SFI-RNTI) from the PDCCH regions 520, 522, and 524 in a slot n 500, a slot n+2 502, and a slot n+4 504, according to the PDCCH regions 520, 522, and 524 and the period, and may obtain, from the detected DCI, an SFI about two slots. In this regard, the detected DCI may include SFI information about two or more slots, and how many slots are to be indicated by an included SFI may be configured by the upper signal. Configuration information about how many slots are to be indicated by the included SFI may be included in a same upper signal that configures the SFI information. For example, referring to FIG. 5, the UE may obtain two pieces of SFI information 510 and 511 about the slot n 500 and a slot n+1 501 from the PDCCH region 520 of the slot n 500. In this regard, a plurality of pieces of SFI information 510, 511, 512, 513, and 514 refer to formats of Table 3 above.

When SFI information is transmitted in the unlicensed band, in particular, when the SFI information includes SFIs about a plurality of slots, the BS may not determine the SFI information about at least one slot, when failing to access a channel in the unlicensed band. In other words, referring to FIG. 5, when the BS performs a channel access procedure on the unlicensed band before the slot n 500, determines that the unlicensed band is an idle channel according to a result of the channel access procedure, and then occupies and uses channels from the slot n 500 to the slot n+4 504, the BS cannot estimate a channel access procedure result with respect to the unlicensed band in a slot n+5 505, and thus the BS cannot determine an SFI of the slot n+5 505. In other words, when the BS transmits two pieces of SFI information 514 and 515 about the slot n+4 504 and the slot n+5 505 in the PDCCH region 524, it is necessary for the BS to determine how to indicate SFI information of the slot n+5 505. For example, the BS may indicate that an SFI of a time other than a COT is flexible.

Figure 6:
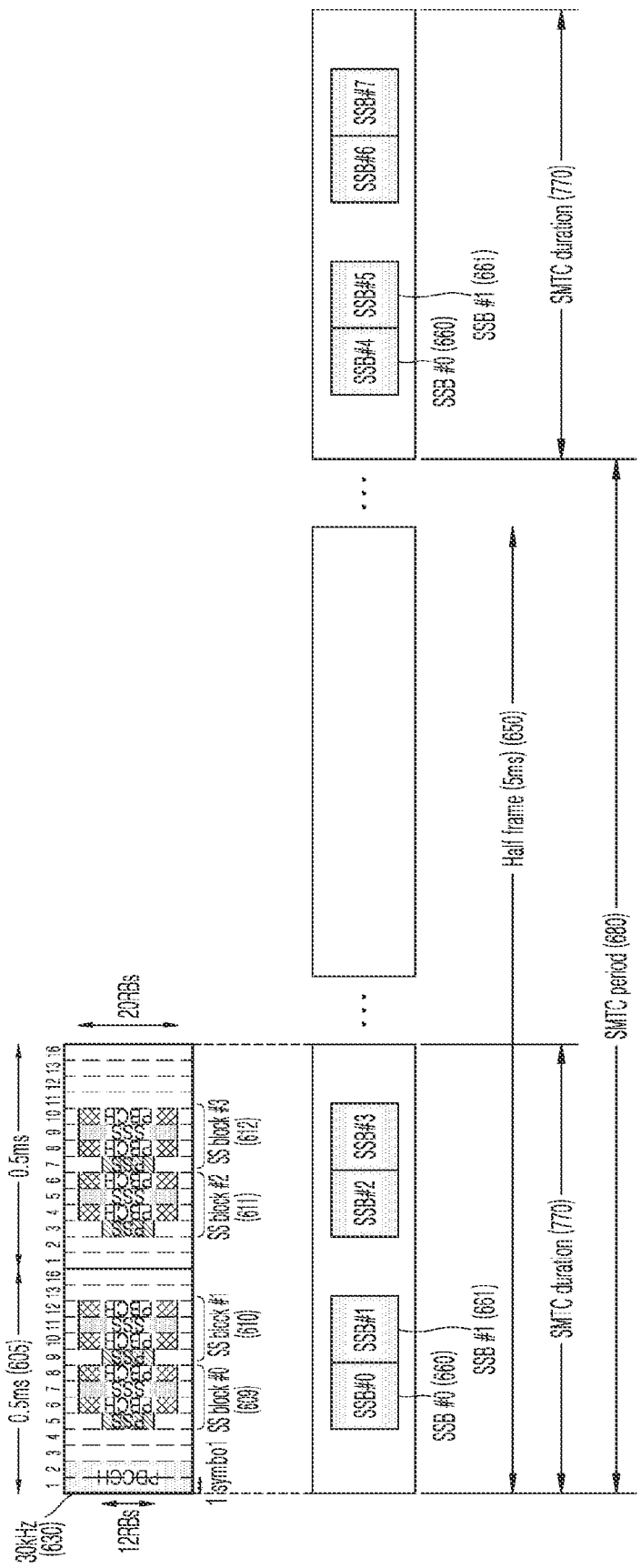
FIG. 6 is a diagram illustrating a part of a transmission pattern of a synchronization signal block in a frequency band less than or equal to 6 GHz which is considered for a $5^{th}$ (5G) communication system.

FIG. 6 illustrates a part of a transmission pattern of a synchronization signal block in a frequency band less than or equal to 6 GHz which is considered for the 5G communication system.

Referring to FIG. 6, in the 5G communication system, subcarrier spacing of 15 kHz and subcarrier spacing of 30 kHz may be used in transmitting the synchronization signal block in the frequency band equal to or smaller than 6 GHZ, and FIG. 6 illustrates one of synchronization signal block transmission patterns having subcarrier spacing of 30 KHz.

In subcarrier spacing of 30 KHz 630, maximum two synchronization signal blocks may be transmitted within 0.5 ms 605 (or, corresponding to a one-slot length when one slot is composed of 14 OFDM symbols), such that maximum four synchronization signal blocks may be transmitted within 1 ms (or, corresponding to a two-slot length when one slot is composed of 14 OFDM symbols). In an example of FIG. 6, synchronization signal block #0 609, synchronization signal block #1 610, synchronization signal block #2 611, and synchronization signal block #3 612 are transmitted within 1 ms (two slots). In this regard, synchronization signal block #0 609 and synchronization signal block #1 610 may be respectively mapped to a $5^{th}$ OFDM symbol and a $9^{th}$ OFDM symbol, and synchronization signal block #2 611 and synchronization signal block #3 612 may be respectively mapped to a $3^{rd}$ OFDM symbol and a $7^{th}$ OFDM symbol. Different analogue beams may be applied to synchronization signal block #0 609, synchronization signal block #1 610, synchronization signal block #2 611, and synchronization signal block #3 612. Alternatively, a same analogue beam may be applied to all of the aforementioned synchronization signal blocks, and application may be decided according to determination by the BS.

A maximum of 64 synchronization signal blocks may be transmitted in a particular time period (e.g., a 5-ms period), and the number L of synchronization signal blocks to be transmitted may vary according to at least one value from among subcarrier spacing of synchronization signal blocks and a carrier frequency on which a synchronization signal block is to be transmitted. For example, maximum 4 synchronization signal blocks may be transmitted in a frequency band less than or equal to 3 GHZ, a maximum of 8 synchronization signal blocks may be transmitted in a frequency band from 3 GHz to 6 GHZ, and a maximum of 64 synchronization signal blocks may be transmitted in a frequency band greater than or equal to 6 GHZ. An example of synchronization signal blocks with subcarrier spacing of 30 kHz and in a frequency band greater than or equal to 6 GHz is illustrated in FIG. 6. In this regard, a maximum number of synchronization signal blocks to be transmitted in a frequency band is an example and, thus, the present disclosure is not limited thereto. In addition, the maximum number of synchronization signal blocks to be transmitted may be independently defined in each of the frequency bands.

When the UE performs wireless communication on the BS, the UE may perform monitoring on a radio link state (hereinafter, RLM) by measuring a DL radio link quality from the BS. When a determined DL radio link state or a determined DL quality becomes lower than a reference value out of synchronization (OOS), the UE may determine that a radio link with the BS fails (a radio link failure (RLF)) and may perform a new radio link operation a new BS or the BS or may perform a handover operation on a new BS. That is, the UE may manage or monitor mobility of the UE by performing a RLM operation. When the determined DL radio link state or the determined DL quality is equal to or greater than the reference value (IS), the UE may maintain a radio link with the BS and may perform communication. In this regard, the UE may perform RLM by using one of a synchronization signal block (hereinafter, SSB-RLM) or a CSI-RS (hereinafter, SSB-RLM), or by using both the synchronization signal block and the CSI-RS. The UE may be configured with respect to a signal to be used in performing the RLM, through an upper signal from the BS as below.

```
RadioLinkMontioringRS ::=        SEQUENCE {
    radioLinkMonitoringRS-Id        RadioLinkMonitoringRS-Id,
    purpose                         ENUMERATED [beamFailure, rlf, both],
    detectionResource               CHOICE {
        ssb-Index                       SSB-Index,
        csi-RS-Index                    NZP-CSI-ResourceId
    },
    ...
}
```

Hereinafter, an embodiment of the present disclosure is described, assuming that RLM is to be performed by using a synchronization signal block, but methods proposed in the embodiment of the present disclosure may also be applied to a case where the RLM is performed by using a CSI-RS and a case where the RLM is performed by using both the synchronization signal block and the CSI-RS. In addition, hereinafter, the embodiment of the present disclosure may be applied to both beam-unit RLM and RLF and cell-unit RLM and RLF, but cell-unit RLM and RLF are described below.

The UE may be configured with respect to related variables for determining RLM through at least one signaling of SIB or RRC signaling from the BS. For example, the UE may receive an index (BLER threshold pair index) of a pair of block error rate (BLER) threshold values (Qout, Qin) used in determining IS/OOS, and rlf-TimersAndConstants information including values of constants N310 and N311 and a value of a timer T310 or information of the constants and the timer. Here, the BLER threshold pair index is an index value indicating one of pairs of BLER values of predefined IS/OOS. The UE may determine a PDCCH reception error occurrence probability value (Hypothetical PDCCH BLER) by using DL quality information including a SNR or a signal-to-interference and noise ratio (SINR), the DL quality information being measured by using a RLM-RS. The UE may compare a determined BLER value with each of set BLER values (Qout, Qin) with respect to IS/OOS and thus may monitor a radio link state. For example, when the BLER value determined through the aforementioned process is equal to or greater than reference values (Qout, Qin) that are set for determination of IS/OOS, the UE may determine that the radio link state is good or corresponds to IS. When the BLER value determined through the aforementioned process is smaller than the reference values (Qout, Qin) that are set for determination of IS/OOS, the UE may determine that the radio link state is not good or corresponds to OOS. Here, the UE may indicate, to a higher layer, the radio link state (i.e., occurrence of IS or OOS) that is determined or monitored through the aforementioned process. In this regard, a time to measure IS/OOS (or an evaluation time) may be independent according to a state of the UE (e.g., Discontinuous Reception (DRX) or non-DRX, or a DRX cycle (e.g., when a DRX cycle is smaller than 320 or is equal to or greater than 320). Here, DRX indicates that the UE does not receive a DL signal in a particular time period configured through an upper signal.

Examples of an evaluation time to measure a radio link quality by performing RLM using a synchronization signal block are provided below.

| Configuration | $T_{Evaluate\_out}$ (ms) | $T_{Evaluate\_in}$ (ms) |
|---|---|---|
| Non-DRX | Max(200, ceil(10*P)*$T_{SSB}$) | Max(100, ceil(10*P)*$T_{SSB}$) |
| DRX cycle <= 320 | Max(200, ceil(15*P)*max($T_{DRX}$, $T_{SSB}$)) | Max(200, ceil(7.5*P)*max($T_{DRX}$, $T_{SSB}$)) |
| DRX cycle > 320 | ceil(10*P)*$T_{DRX}$ | ceil(5*P)*$T_{DRX}$ |

Note:
$T_{SSB}$ is the periodicity of SSB configured for RLM.
$T_{DRX}$ is the DRX cycle length When an occurrence of N310 consecutive OOSs is indicated through an upper layer, the UE may operate a timer corresponding to a value of T310. When the timer stops, the UE may determine a RLF and may transit to an idle mode state (RRC_IDLE) or may perform a new link finding operation by performing an operation of searching for a new radio link, e.g., an initial access process. While the T310 timer operates, when occurrence of N311 consecutive ISs is indicated through the upper layer, the UE may stop the T310 timer. Here, example of configurable values of N310, N311, and T310 are provided below but are not limited thereto.

```
RLF-TimersAndConstants ::=  SEQUENCE {
    t310                    ENUMERATED (ms0, ms50, ms100, ms200, ms500, ms1000,
ms2000, ms4000, ms6000),
    n310                    ENUMERATED {n1, n2, n3, n4, n6, n8, n10, n20},
```

```
n211                    ENUMERATED {n1, n2, n3, n4, n5, n6, n8, n10},
...,
[[
t311-v15xy              ENUMERATED {ms1000, ms3000, ms5000, ms10000, ms15000,
ms20000, ms30000}
    ]]
}
```

When the UE is configured to perform RLM by using at least one of a synchronization signal block or a CSI-RS in the unlicensed band, the UE may measure a quality or strength of a configured signal (hereinafter, a RLM-RS), may compare a measured value with a preset threshold value, and thus may determine whether a radio link state corresponds to IS or OOS, in a similar manner described above. However, when the BS does not succeed in a channel ConfigMobility of an upper signal. In this regard, the SSB-ToMeasure information may be bitmap information indicating a synchronization signal block index, and a bit number may vary according to a frequency band to be measured. For example, for a frequency band of 5 GHz, the synchronization signal block to be used as the RLM-RS may be configured through an 8-bit bitmap.

```
SSB-ConfigMobility::=      SEQUENCE {
    ssb-ToMeasure              SetupRelease { SSB-ToMeasure }  OPTIONAL, --
Need M
    deriveSSB-IndexFromCell    BOOLEAN,
    ss-RSSI-Measurement            SS-RSSI-Measurement  OPTIONAL,  -- Need M
    ...
}
SSB-ToMeasure ::=          CHOICE {
    shortBitmap                BIT STRING (SIZE (4)),
    mediumBitmap               BIT STRING (SIZE (8)),
    longBitmap                 BIT STRING (SIZE (64))
}
``` access procedure until the configured RLM-RS is transmitted, i.e., when the BS fails to transmit the RLM-RS due to failure of the channel access procedure, the UE cannot measure a quality of the RLM-RS, may measure a quality of an incorrect RLM-RS, or may determine a quality of the RLM-RS or a received SNR value to be very low. By doing so, the UE may perform an incorrect RLM operation including an operation of unnecessarily determining that a radio link quality with the BS is in an OOS state. Therefore, the present disclosure provides a method, performed by the UE, of correctly performing RLM.

Hereinafter, a method and apparatus for efficiently and correctly performing RLM, which are provided in embodiments of the disclosure, are not limitedly applied to each embodiment of the disclosure, and may be applied to a method, performed by the UE, of further efficiently and correctly performing RLM by using completely or partially using one or more embodiments of the present disclosure.

Embodiment 1

Hereinafter, the present disclosure provides a method of configuring an RLM-RS between the BS and the UE operating in the unlicensed band, and a method, performed by the UE, of determining a valid RLM-RS.

The UE may be configured, through an upper signal, to perform RLM by using at least one signal of a synchronization signal block or a CSI-RS. In this regard, the UE may monitor a state or quality of a DL radio link with the BS in a configured RLM-RS time, at a G frequency resource. Detailed descriptions will now be provided with reference to an example in which the UE is configured for a synchronization signal block as a RLM-RS. The UE may obtain index information of the synchronization signal block to be used as the RLM-RS from SSB-ToMeasure information of SSB- When the synchronization signal block is used as the RLM-RS, the UE may receive and determine configuration information about a time to perform an RLM operation (SS/PBCH block measurement timing configuration (SMTC)) by using the RLM-RS, through SSB-MTC of the upper signal from the BS. For example, the SSB-MTC may be composed of an SMTC period, a subframe offset (or information indicating an SMTC start subframe), and SMTC duration or length information. The UE may determine, based on period, offset, and duration information, SMTC duration configured by the BS so as to perform RLM, and may perform the RLM operation by using the RLM-RS configured for the SMTC duration.

This process is described below with reference to FIG. 6.

The BS may configure, as a RLM-RS, synchronization signal block #0 660 and synchronization signal block #1 661 to the UE by using bitmap information of the SSB-ToMeasure information of the upper signal. In addition, the BS may configure, by using the SSB-MTC of the upper signal, RLM operation duration to the UE through information of an SMTC period 680, offset (that is 0 in a case of FIG. 6), and duration 660.

When the BS and the UE perform RLM by using a RLM-RS transmitted through the unlicensed band, the BS may not be able to transmit the RLM-RS within a configured time due to a failure of a channel access procedure. In this regard, the UE cannot correctly measure a radio link quality by using the RLM-RS, may receive a RLM-RS from an adjacent cell or an adjacent operator, not from a serving cell, may incorrectly measure a radio link quality by measuring a radio link quality by using signals from different systems, or may determine a quality of the RLM-RS or a value of a reception SNR to be very low. Due to that, the UE may perform an incorrect RLM operation by measuring a radio link quality that is not an actual radio link quality or by determining a radio link quality to be an OOS state, even when the actual radio link quality is good, or may cause a long time delay in determining IS/OOS state. Therefore, the disclosure provides a method, performed by the UE, of further correctly and rapidly performing an RLM operation with an increase in an RLM-RS transmission opportunity.

Figure 7A:
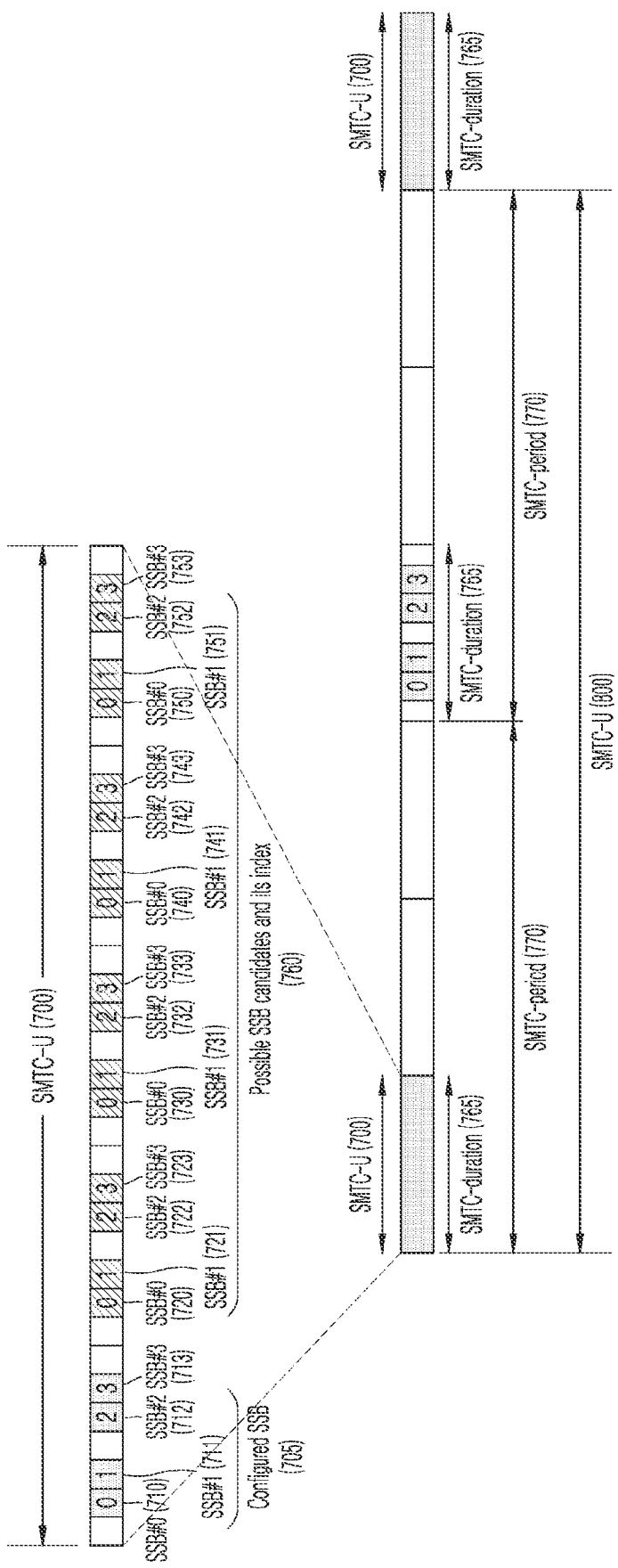
FIG. 7A is a diagram for describing an RLM method, according to an embodiment.
Figure 7B:
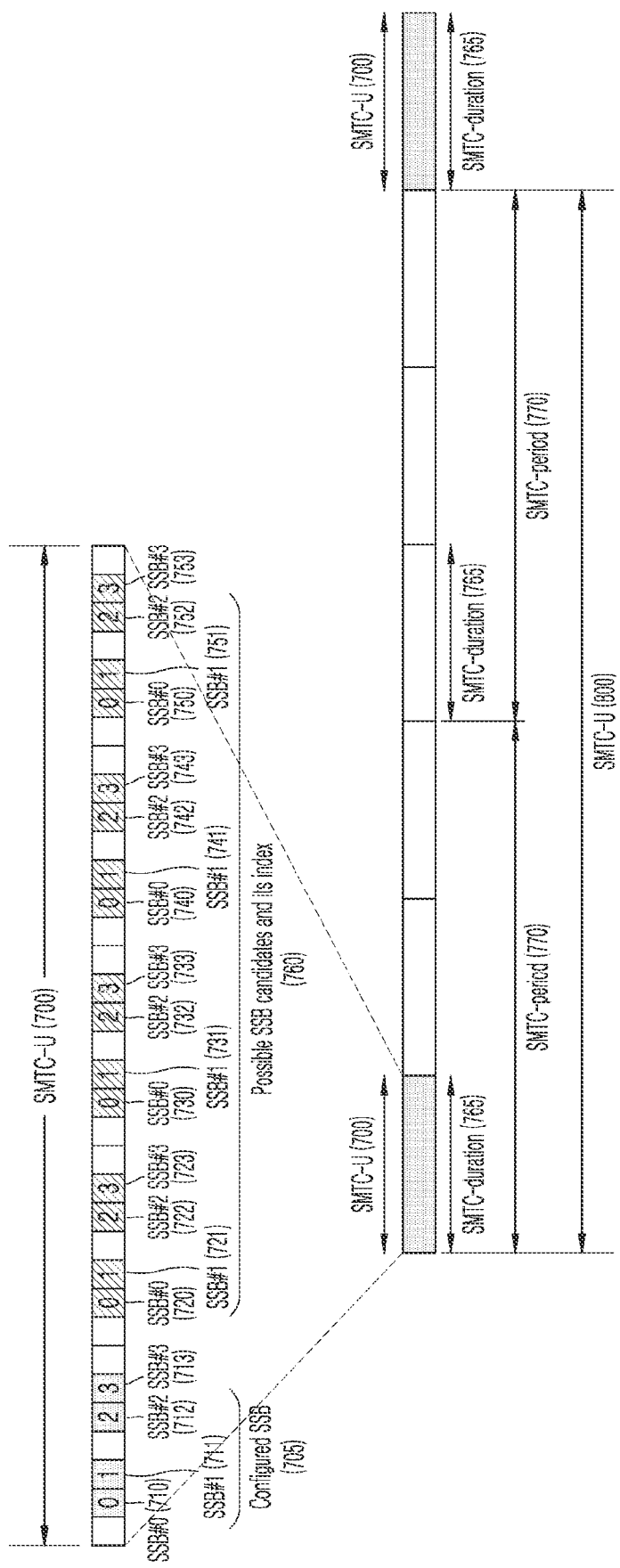
FIG. 7B is a diagram for describing an RLM method, according to an embodiment.
Figure 7C:
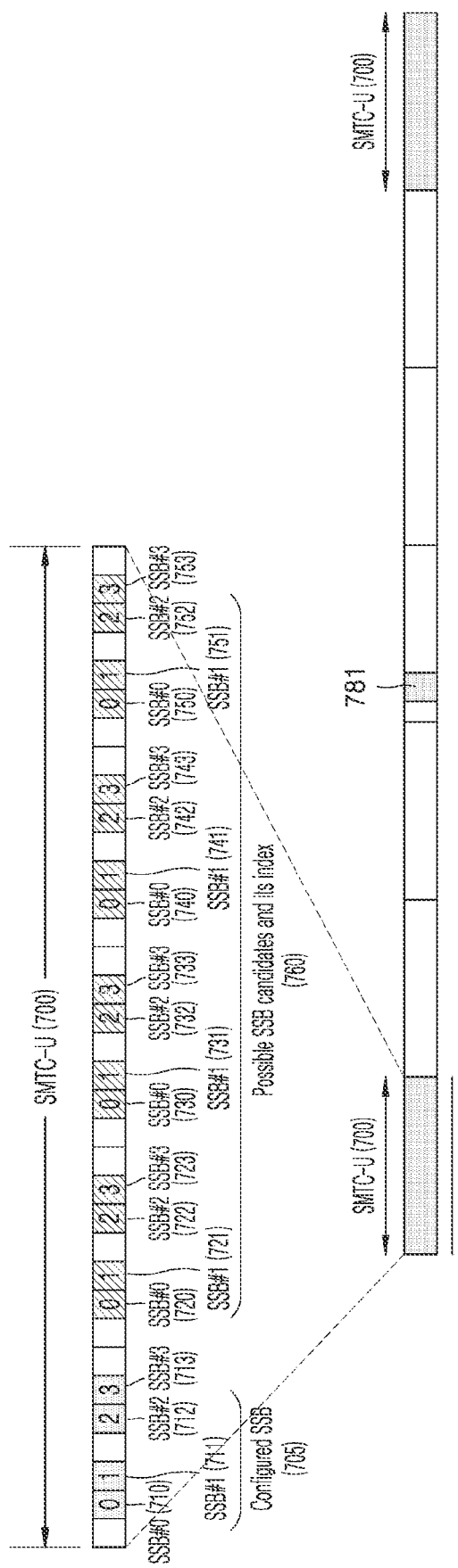
FIG. 7C is a diagram for describing an RLM method, according to an embodiment.

FIGS. 7A, 7B, and 7C are diagrams for describing an RLM method, according to an embodiment.

Method 1: When the BS and the UE perform RLM by using an RLM-RS transmitted through the unlicensed band, the RLM is performed on all candidates in which configured RLM-RS may be transmitted in SMTC-U duration.

Referring to FIG. 7A, Method 1 is described below. The BS may configure, as a RLM-RS, synchronization signal block #0 710 and synchronization signal block #1 711 to the UE by using information such as SSB-ToMeasure information of an upper signal. In addition, the BS may transmit, through information such as SSB-MTC of the upper signal, period, offset, and duration information of SMTC where the UE is to perform the RLM, and based on configuration information, the UE may determine SMTC duration and may perform the RLM in the determined SMTC duration. When the BS and the UE perform RLM by using a RLM-RS transmitted through the unlicensed band, the BS may transmit information of a period 770, offset (that is 0 in a case of FIG. 7A), and duration 700 of SMTC-U where the UE is to perform the RLM through the unlicensed band, by using an upper signal such as SSB-MTC-U that is different from the SSB-MTC, and the UE may additionally determine SMTC-U duration, based on configuration information. In the case of FIG. 7A, the SMTC and the SMTC-U are described while being distinguished therebetween, but the SMTC and the SMTC-U may be the same or the SMTC may include the SMTC-U. Alternatively, without distinguishing between the SMTC and the SMTC-U, only the SMTC may be configured.

```
SSB-MTC-U ::=            SEQUENCE {
    periodicityAndOffset    CHOICE {
        sf5                 INTEGER (0..4),
        sf10                INTEGER (0..9),
        sf20                INTEGER (0..19),
        sf40                INTEGER (0..39),
        sf80                INTEGER (0..79),
        sf160               INTEGER (0..159)
    },
    duration                ENUMERATED { sf1, sf2, sf3, sf4, sf5 }
}
```

Here, the SMTC-U indicates duration where a configured RLM-RS may be transmitted multiple times. In a case where the BS is configured to transmit X synchronization signal blocks, referring to FIG. 7A, SMTC-U duration 700 may include candidate time resource domains where the X synchronization signal blocks are transmittable. The candidate time resource domains where the X synchronization signal blocks are transmittable are illustrated while assuming FIG. 6, and synchronization signal block indexes may be mapped to periodically circulate the X synchronization signal blocks. In other words, FIG. 7A illustrates an example in which, assuming X=4 705, synchronization signal block #0 710, synchronization signal block #1 711, synchronization signal block #2 712, and synchronization signal block #3 713 are mapped, and then synchronization signal block #0 720, synchronization signal block #1 721, synchronization signal block #2 722, and synchronization signal block #3 723 are mapped in a circulating manner. In this regard, when the BS could not access the unlicensed band before the BS transmits synchronization signal block #0 710, but the BS accesses the unlicensed band before the BS transmits synchronization signal block #1 711, the BS may transmit synchronization signal block #1 711, synchronization signal block #2 712, synchronization signal block #3 713, and synchronization signal block #0 720. In other words, in SMTC-U duration, an opportunity to transmit a configured RLM-RS is increased, compared to that of SMTC, and thus, the UE may further efficiently perform a RLM operation. Because, in SMTC-U duration, the BS performs a channel access procedure during a short fixed time such as Type 2 channel access procedure or transmits a RLM-RS without separately performing a channel access procedure such as Type 3 channel access procedure, a probability that a configured RLM-RS is transmittable in the SMTC-U duration 700 may be greater than a probability that the configured RLM-RS is transmittable in SMTC duration 765. Therefore, the UE in which SMTC-U is configured may perform RLM by using all of candidates (SSB #0 710, SSB #1 711, SSB #0 720, SSB #1 721, SSB #0 730, SSB #1 731, SSB #0 740, SSB #1 741, SSB #0 750, and SSB #1 751) where a configured RLM-RS is transmittable in SMTC-U. In this regard, the UE performs RLM by using all of the candidates (SSB #0 710, SSB #1 711, SSB #0 720, SSB #1 721, SSB #0 730, SSB #1 731, SSB #0 740, SSB #1 741, SSB #0 750, and SSB #1 751) where the configured RLM-RS is transmittable in the SMTC-U, regardless of whether the configured RLM-RS has been actually transmitted in the SMTC-U, such that the UE may perform RLM without checking a channel occupancy state of the BS.

Here, the UE may determine that the configured RLM-RS has been actually transmitted in the SMTC-U, by using methods below.

Method A: In a case where the configured RLM-RS is a synchronization signal block, the UE may determine that the RLM-RS has been transmitted when at least one of signals is detected, the signals including Primary Synchronization Signal (PSS), Primary Synchronization Signal (SSS), PBCH, and DeModulation Reference Signal (DMRS) of Physical Broadcast Channel (PBCH) with respect to the synchronization signal block configured as the RLM-RS. In this regard, the UE may determine that the RLM-RS has been transmitted when at least one of values including magnitude, an SNR, and a correlation value of a reception signal is greater than a predefined threshold value or a threshold value configured by an upper signal, the reception signal being with respect to at least one of signals including PSS, SSS, PBCH, and DMRS of PBC with respect to the synchronization signal block configured as the RLM-RS. In a case where a CSI-RS is configured as the RLM-RS, when a signal with respect to the CSI-RS configured as the RLM-RS is detected or at least one of values including magnitude, an SNR, and a correlation value of a reception signal with respect to the CSI-RS is greater than the predefined threshold value or the threshold value configured by the upper signal, the UE may determine that the RLM-RS has been transmitted. In this regard, in addition to reference values (Qout, Qin) configured for determining IS or OOS in a RLM process, the UE may be configured with respect to a reference value (e.g., Qrx) for determining whether a RLM-RS has been transmitted. Here, Qrx may be configured through an upper signal separate from the reference values (Qout, Qin) configured for determining IS or OOS, or a pair (Qout, Qin and Qrx) may be configured.

Method B: As another method, when the UE receives SFI information about SMTC-U or SMTC transmission duration or a slot or a symbol at which RLM-RS transmission is configured in the SMTC-U or SMTC transmission duration, and when the SFI information indicates that the slot or the symbol at which RLM-RS transmission is configured is a DL symbol, the UE may determine that the RLM-RS has been transmitted. Even when the SFI information indicates that the slot or the symbol at which RLM-RS transmission is configured is a flexible symbol, the UE may determine that the RLM-RS has been transmitted. In this regard, the UE may differently determine, according to the SMTC-U or SMTC transmission duration, whether a RLM-RS has been actually transmitted, with respect to the RLM-RS indicated using a flexible symbol. For example, in a case of the SMTC-U transmission duration, when the SFI information indicates that the slot or the symbol at which RLM-RS transmission is configured is the flexible symbol, the UE may determine that the RLM-RS has been transmitted. In a case of the SMTC transmission duration, when the SFI information indicates that the slot or the symbol at which RLM-RS transmission is configured is the flexible symbol, the UE may determine that the RLM-RS has not been transmitted or may determine, based on additional determination using Method B, whether the RLM-RS has been transmitted. This is because only a synchronization signal block or a CSI-RS can be transmitted without additional transmission of SFI information in the SMTC-U transmission duration. In this regard, the UE receives not only the SFI information but also receives DCI for scheduling PDSCH reception with respect to the slot or the symbol at which RLM-RS transmission is configured, and thus may determine that the RLM-RS has been actually transmitted even when the UE determines that the slot or the symbol at which RLM-RS transmission is configured is a DL symbol. When the UE receives DCI for scheduling or indicating a UL signal or channel (PUSCH/PUCCH/PRACH/SRS) transmission with respect to the slot or the symbol at which RLM-RS transmission is configured, the UE may determine that the slot or the symbol at which RLM-RS transmission is configured is a UL symbol and thus may determine that the RLM-RS has not been transmitted.

When a plurality of RLM-RSs are detected, the UE may determine, as a valid RLM-RS, a RLM-RS of which reception signal strength (or a SNR or a SINR) is largest from among the plurality of detected RLM-RSs, and may perform a RLM operation by using the RLM-RS. In this regard, even when the plurality of RLM-RSs are detected, the UE may receive a PBCH or an SIB with respect to a RLM-RS and thus may identify the RLM-RS from among the plurality of RLM-RSs, the RLM-RS being configured as a RLM-RS. For example, when a plurality of cells each transmit a RLM-RS configured as a RLM-RS to the UE, the UE having received the plurality of RLM-RSs may receive and decode at least one of a PBCH for a synchronization signal block or an SIB connected to the synchronization signal block, and may perform RLM by using a RLM-RS from a serving cell that is a cell on which the RLM is to be performed, the RLM-RS being from among the plurality of RLM-RSs.

The UE may perform the RLM by using the RLM-RS from the serving cell by using one of various methods described below. For example, when the UE determines that RLM-RSs are not transmitted from all candidate domains in which a configured RLM-RS is transmittable in SMTC-U, the UE may determine OOS and thus may indicate or transmit OOS occurrence to an upper layer. In this regard, when the UE determines that RLM-RSs are not transmitted from all candidate domains in which the configured RLM-RS is transmittable in SMTC-U, the UE may not perform an RLM operation. In other words, in the aforementioned descriptions, the UE may not determine IS or OOS in SMTC-U, or even when the UE determines IS or OOS, the UE may not perform indication or transmission with respect to IS or OOS to the upper layer. For example, when the UE determines that a configured RLM-RS has been transmitted from at least one of candidate domains in which the configured RLM-RS is transmittable in SMTC-U, performs RLM thereon and thus determines OOS, the UE may indicate or transmit OOS occurrence to an upper layer. For example, when the UE determines that all configured RLM-RSs have been transmitted from one or more candidate domains in which a configured RLM-RS is transmittable in SMTC-U, performs RLM thereon and thus determines OOS with respect to all configured RLM-RSs, the UE may indicate or transmit OOS occurrence to the upper layer. When the UE determines that a configured RLM-RS has been transmitted from at least one of candidate domains in which the configured RLM-RS is transmittable in SMTC-U, performs RLM thereon and thus determines IS, the UE may indicate or transmit IS occurrence to the upper layer. For example, when the UE determines that all configured RLM-RSs have been transmitted from one or more candidate domains in which a configured RLM-RS is transmittable in SMTC-U, performs RLM thereon and thus determines IS with respect to all configured RLM-RSs, the UE may indicate or transmit IS occurrence to the upper layer.

Embodiment 2

Hereinafter, the present disclosure provides a method of configuring an RLM-RS between the BS and the UE operating in the unlicensed band, and a method, performed by the UE, of determining an efficient RLM-RS.

The UE may be configured, through an upper signal, to perform RLM by using at least one signal of a synchronization signal block or a CSI-RS. In this regard, the UE may monitor a state or quality of a DL radio link with the BS in a configured RLM-RS time, at a G frequency resource. Detailed descriptions are provided below with reference to an example in which the UE is configured for a synchronization signal block as an RLM-RS. The UE may obtain index information of the synchronization signal block to be used as the RLM-RS from SSB-ToMeasure information of SSB-ConfigMobility of an upper signal. In this regard, the SSB-ToMeasure information may be bitmap information indicating a synchronization signal block index, and a bit number may vary according to a frequency band to be measured. For example, for a frequency band of 5 GHZ, the synchronization signal block to be used as the RLM-RS may be configured through an 8-bit bitmap.

```
SSB-ConfigMobility::=        SEQUENCE {
    ssb-ToMeasure                SetupRelease { SSB-ToMeasure } OPTIONAL, --
Need M
    deriveSSB-IndexFromCell      BOOLEAN,
    ss-RSSI-Measurement              SS-RSSI-Measurement  OPTIONAL,  -- Need M
    ...
```

```
}
SSB-ToMeasure ::=        CHOICE {
   shortBitmap              BIT STRING (SIZE (4)),
   mediumBitmap             BIT STRING (SIZE (8)),
   longBitmap               BIT STRING (SIZE (64))
}
```

When the synchronization signal block is used as the RLM-RS, the UE may receive and determine configuration information about a time to perform an RLM operation (SMTC) by using the RLM-RS, through SSB-MTC of the upper signal from the BS. For example, the SSB-MTC may be composed of an SMTC period, a subframe offset (or information indicating an SMTC start subframe), and SMTC duration or length information. The UE may determine, based on period, offset, and duration information, SMTC duration configured by the BS so as to perform RLM, and may perform the RLM operation by using the RLM-RS configured for the SMTC duration.

This process is described below with reference to FIG. 6.

The BS may configure, as a RLM-RS, synchronization signal block #0 660 and synchronization signal block #1 661 to the UE by using bitmap information of the SSB-ToMeasure information of the upper signal. In addition, the BS may configure, by using the SSB-MTC of the upper signal, RLM operation duration to the UE through information of an SMTC period 680, offset (that is 0 in a case of FIG. 6), and duration 660.

When the BS and the UE perform RLM by using a RLM-RS transmitted through the unlicensed band, the BS may not be able to transmit the RLM-RS within a configured time due to a failure of a channel access procedure. In this regard, the UE cannot correctly measure a radio link quality by using the RLM-RS, may receive a RLM-RS from an adjacent cell or an adjacent operator, not from a serving cell, may incorrectly measure a radio link quality by measuring a radio link quality by using signals from different systems, or may determine a quality of the RLM-RS or a value of a reception SNR to be very low. Due to that, the UE may perform an incorrect RLM operation by measuring a radio link quality that is not an actual radio link quality or by determining a radio link quality to be an OOS state, even when the actual radio link quality is good, or may cause a long time delay in determining IS/OOS state. Therefore, the disclosure provides a method, performed by the UE, of further correctly and rapidly performing a RLM operation with an increase in a RLM-RS transmission opportunity.

Method 2: When the BS and the UE perform RLM by using a RLM-RS transmitted through the unlicensed band, the RLM is performed on one of candidates in which configured RLM-RS is transmittable in SMTC-U duration or is performed on a RLM-RS that has been actually transmitted.

Method 2 is described below with reference to FIG. 7A. The BS may configure, as a RLM-RS, synchronization signal block #0 710 and synchronization signal block #1 711 to the UE by using information such as SSB-ToMeasure information of an upper signal. In addition, the BS may transmit, through information such as SSB-MTC of the upper signal, period, offset, and duration information of SMTC where the UE is to perform the RLM, and based on configuration information, the UE may determine SMTC duration and may perform the RLM in the determined SMTC duration. When the BS and the UE perform RLM by using a RLM-RS transmitted through the unlicensed band, the BS may transmit information of a period 770, offset (that is 0 in a case of FIG. 7A), and duration 700 of SMTC-U where the UE is to perform the RLM through the unlicensed band, by using an upper signal such as SSB-MTC-U that is different from the SSB-MTC, and the UE may additionally determine SMTC-U duration, based on configuration information. In the case of FIG. 7A, the SMTC and the SMTC-U is described below while being distinguished therebetween, but this is only an example and, thus, the SMTC and the SMTC-U may be the same or the SMTC may include the SMTC-U. Alternatively, without distinguishing between the SMTC and the SMTC-U, only the SMTC may be configured.

Here, the SMTC-U indicates duration where a configured RLM-RS may be transmitted multiple times. In a case where the BS is configured to transmit X synchronization signal blocks, referring to FIG. 7A, SMTC-U duration 700 may include candidate time resource domains where the X synchronization signal blocks are transmittable. The candidate time resource domains where the X synchronization signal blocks are transmittable are illustrated while assuming FIG. 6, and synchronization signal block indexes may be mapped to periodically circulate the X synchronization signal blocks. In other words, FIG. 7A illustrates an example in which, assuming X=4 705, synchronization signal block #0 710, synchronization signal block #1 711, synchronization signal block #2 712, and synchronization signal block #3 713 are mapped, and then synchronization signal block #0 720, synchronization signal block #1 721, synchronization signal block #2 722, and synchronization signal block #3 723 are mapped in a circulating manner. In this regard, when the BS could not access the unlicensed band before the BS transmits synchronization signal block #0 710, but the BS accesses the unlicensed band before the BS transmits synchronization signal block #1 711, the BS may transmit synchronization signal block #1 711, synchronization signal block #2 712, synchronization signal block #3 713, and synchronization signal block #0 720. In other words, in SMTC-U duration, an opportunity to transmit a configured RLM-RS is increased, compared to that of SMTC, and thus, the UE may further efficiently perform a RLM operation. Because, in SMTC-U duration, the BS performs a channel access procedure during a short fixed time such as Type 2 channel access procedure or transmits a RLM-RS without separately performing a channel access procedure such as Type 3 channel access procedure, a probability that a configured RLM-RS is transmittable in the SMTC-U duration 700 may be greater than a probability that the configured RLM-RS is transmittable in SMTC duration 765. Therefore, the UE in which SMTC-U is configured may perform RLM by using RLM-RSs (e.g., SSB #1 711, SSB #2 712, SSB #3 713, and SSB #0 720) that are actually transmitted from among candidates (SSB #0 710, SSB #1 711, SSB #0 712, SSB #0 713, SSB #0 720, SSB #1 721, SSB #0 730, SSB #1 731, SSB #0 740, SSB #1 741, SSB #0 750, and SSB #1 751) where a configured RLM-RS is transmittable in SMTC-U.

In other words, the UE may perform RLM by using a RLM-RS that is determined to have been actually transmitted from among the candidates (SSB #0 710, SSB #1 711, SSB #0 720, SSB #1 721, SSB #0 730, SSB #1 731, SSB #0 740, SSB #1 741, SSB #0 750, and SSB #1 751) where a configured RLM-RS is transmittable in SMTC-U.

Here, the UE may determine that the configured RLM-RS has been actually transmitted in the SMTC-U, by using methods described below.

Method A: In a case where the configured RLM-RS is a synchronization signal block, the UE may determine that the RLM-RS has been transmitted when at least one of signals is detected, the signals including PSS, SSS, PBCH, and DMRS of PBCH with respect to the synchronization signal block configured as the RLM-RS. In this regard, the UE may determine that the RLM-RS has been transmitted when at least one of values including magnitude, an SNR, and a correlation value of a reception signal is greater than a predefined threshold value or a threshold value configured by an upper signal, the reception signal being with respect to at least one of signals including PSS, SSS, PBCH, and DMRS of PBC with respect to the synchronization signal block configured as the RLM-RS. In a case where a CSI-RS is configured as the RLM-RS, when a signal with respect to the CSI-RS configured as the RLM-RS is detected or at least one of values including magnitude, an SNR, and a correlation value of a reception signal with respect to the CSI-RS is greater than the predefined threshold value or the threshold value configured by the upper signal, the UE may determine that the RLM-RS has been transmitted. In this regard, in addition to reference values (Qout, Qin) configured for determining IS or OOS in a RLM process, the UE may be configured with respect to a reference value (e.g., Qrx) for determining whether a RLM-RS has been transmitted. Here, Qrx may be configured through an upper signal separate from the reference values (Qout, Qin) configured for determining IS or OOS, or a pair (Qout, Qin and Qrx) may be configured.

Method B: As another method, when the UE receives SFI information about SMTC-U or SMTC transmission duration or a slot or a symbol at which RLM-RS transmission is configured in the SMTC-U or SMTC transmission duration, and when the SFI information indicates that the slot or the symbol at which RLM-RS transmission is configured is a DL symbol, the UE may determine that the RLM-RS has been transmitted. Even when the SFI information indicates that the slot or the symbol at which RLM-RS transmission is configured is a flexible symbol, the UE may determine that the RLM-RS has been transmitted. In this regard, the UE may differently determine, according to the SMTC-U or SMTC transmission duration, whether a RLM-RS has been actually transmitted, with respect to the RLM-RS indicated using a flexible symbol. For example, in a case of the SMTC-U transmission duration, when the SFI information indicates that the slot or the symbol at which RLM-RS transmission is configured is the flexible symbol, the UE may determine that the RLM-RS has been transmitted. In a case of the SMTC transmission duration, when the SFI information indicates that the slot or the symbol at which RLM-RS transmission is configured is the flexible symbol, the UE may determine that the RLM-RS has not been transmitted or may determine, based on additional determination using Method B, whether the RLM-RS has been transmitted. This is because only a synchronization signal block or a CSI-RS can be transmitted without additional transmission of SFI information in the SMTC-U transmission duration.

When a plurality of RLM-RSs are detected, the UE may determine, as a valid RLM-RS, a RLM-RS of which reception signal strength (or a SNR or a SINR) is largest from among the plurality of detected RLM-RSs, and may perform a RLM operation by using the RLM-RS. In this regard, even when the plurality of RLM-RSs are detected, the UE may receive a PBCH or an SIB with respect to a RLM-RS and thus may identify the RLM-RS from among the plurality of RLM-RSs, the RLM-RS being configured as a RLM-RS. For example, when a plurality of cells each transmit a RLM-RS configured as a RLM-RS to the UE, the UE having received the plurality of RLM-RSs may receive and decode at least one of a PBCH for a synchronization signal block or an SIB connected to the synchronization signal block, and may perform RLM by using a RLM-RS from a serving cell that is a cell on which the RLM is to be performed, the RLM-RS being from among the plurality of RLM-RSs.

The UE may perform the RLM by using the RLM-RS from the serving cell by using one of various methods described below. For example, when the UE determines that RLM-RSs are not transmitted from all candidate domains in which a configured RLM-RS is transmittable in SMTC-U, the UE may determine OOS and thus may indicate or transmit OOS occurrence to an upper layer. In this regard, when the UE determines that RLM-RSs are not transmitted from all candidate domains in which the configured RLM-RS is transmittable in SMTC-U, the UE may not perform an RLM operation. In other words, in the aforementioned descriptions, the UE may not determine IS or OOS in SMTC-U, or even when the UE determines IS or OOS, the UE may not perform indication or transmission with respect to IS or OOS to the upper layer. For example, when the UE determines that a configured RLM-RS has been transmitted from at least one of candidate domains in which the configured RLM-RS is transmittable in SMTC-U, performs RLM thereon and thus determines OOS, the UE may indicate or transmit OOS occurrence to an upper layer. For example, when the UE determines that all configured RLM-RSs have been transmitted from one or more candidate domains in which a configured RLM-RS is transmittable in SMTC-U, performs RLM thereon and thus determines OOS with respect to all configured RLM-RSs, the UE may indicate or transmit OOS occurrence to the upper layer. When the UE determines that a configured RLM-RS has been transmitted from at least one of candidate domains in which the configured RLM-RS is transmittable in SMTC-U, performs RLM thereon and thus determines IS, the UE may indicate or transmit IS occurrence to an upper layer. For example, when the UE determines that all configured RLM-RSs have been transmitted from one or more candidate domains in which a configured RLM-RS is transmittable in SMTC-U, performs RLM thereon and thus determines IS with respect to all configured RLM-RSs, the UE may indicate or transmit IS occurrence to the upper layer.

Embodiment 3

Hereinafter, the present disclosure discloses a method of configuring an RLM-RS between the BS and the UE operating in the unlicensed band, and a method, performed by the UE, of determining an efficient RLM-RS.

The UE may be configured, through an upper signal, to perform RLM by using at least one signal of a synchronization signal block or a CSI-RS. In this regard, the UE may monitor a state or quality of a DL radio link with the BS in a configured RLM-RS time, at a G frequency resource. Detailed descriptions are provided below with reference to an example in which the UE is configured for a synchronization signal block as an RLM-RS. The UE may obtain index information of the synchronization signal block to be used as the RLM-RS from SSB-ToMeasure information of SSB-ConfigMobility of an upper signal. In this regard, the SSB-ToMeasure information may be bitmap information indicating a synchronization signal block index, and a bit number may vary according to a frequency band to be measured. For example, for a frequency band of 5 GHZ, the synchronization signal block to be used as the RLM-RS may be configured through an 8-bit bitmap.

```
SSB-ConfigMobility::=    SEQUENCE {
    ssb-ToMeasure            SetupRelease { SSB-ToMeasure }  OPTIONAL,  --
Need M
    deriveSSB-IndexFromCell  BOOLEAN,
    ss-RSSI-Measurement         SS-RSSI-Measurement   OPTIONAL,  -- Need M
    ...
}
SSB-ToMeasure ::=        CHOICE {
    shortBitmap              BIT STRING (SIZE (4)),
    mediumBitmap             BIT STRING (SIZE (8)),
    longBitmap               BIT STRING (SIZE (64))
}
```

When the synchronization signal block is used as the RLM-RS, the UE may receive and determine configuration information about a time to perform an RLM operation (SMTC) by using the RLM-RS, through SSB-MTC of the upper signal from the BS. For example, the SSB-MTC may be composed of an SMTC period, a subframe offset (or information indicating an SMTC start subframe), and SMTC duration or length information. The UE may determine, based on period, offset, and duration information, SMTC duration configured by the BS so as to perform RLM, and may perform the RLM operation by using the RLM-RS configured for the SMTC duration.

This process is described below with reference to FIG. 6.

The BS may configure, as a RLM-RS, synchronization signal block #0 660 and synchronization signal block #1 661 to the UE by using bitmap information of the SSB-ToMeasure information of the upper signal. Also, the BS may configure, by using the SSB-MTC of the upper signal, RLM operation duration to the UE through information of an SMTC period 680, offset (that is 0 in a case of FIG. 6), and duration 660.

When the BS and the UE perform RLM by using a RLM-RS transmitted through the unlicensed band, the BS may not be able to transmit the RLM-RS within a configured time due to a failure of a channel access procedure. In this regard, the UE cannot correctly measure a radio link quality by using the RLM-RS, may receive a RLM-RS from an adjacent cell or an adjacent operator, not from a serving cell, may incorrectly measure a radio link quality by measuring a radio link quality by using signals from different systems, or may determine a quality of the RLM-RS or a value of a reception SNR to be very low. Due to that, the UE may perform an incorrect RLM operation by measuring a radio link quality that is not an actual radio link quality or by determining a radio link quality to be an OOS state, even when the actual radio link quality is good, or may cause a long time delay in determining IS/OOS state. Therefore, the present disclosure discloses a method, performed by the UE, of further correctly and rapidly performing an RLM operation with an increase in an RLM-RS transmission opportunity.

Method 3: When the BS and the UE perform RLM by using a RLM-RS transmitted through the unlicensed band, the RLM is performed on a configured RLM-RS according to respective references in SMTC-U duration and SMTC duration.

Method 3 is described below with reference to FIG. 7A. The BS may configure, as a RLM-RS, synchronization signal block #0 710 and synchronization signal block #1 711 to the UE by using information such as SSB-ToMeasure information of an upper signal. In addition, the BS may transmit, through information such as SSB-MTC of the upper signal, period, offset, and duration information of SMTC where the UE is to perform the RLM, and based on configuration information, the UE may determine SMTC duration and may perform the RLM in the determined SMTC duration. When the BS and the UE perform RLM by using a RLM-RS transmitted through the unlicensed band, the BS may transmit information of a period 770, offset (that is 0 in a case of FIG. 7A), and duration 700 of SMTC-U where the UE is to perform the RLM through the unlicensed band, by using an upper signal such as SSB-MTC-U that is different from the SSB-MTC, and the UE may additionally determine SMTC-U duration, based on configuration information.

Here, the SMTC-U indicates duration where a configured RLM-RS may be transmitted multiple times. In a case where the BS is configured to transmit X synchronization signal blocks, referring to FIG. 7A, SMTC-U duration 700 may include candidate time resource domains where the X synchronization signal blocks are transmittable. The candidate time resource domains where the X synchronization signal blocks are transmittable are illustrated while assuming FIG. 6, and synchronization signal block indexes are mapped to periodically circulate the X synchronization signal blocks. In other words, FIG. 7A illustrates an example in which, assuming X=4 705, synchronization signal block #0 710, synchronization signal block #1 711, synchronization signal block #2 712, and synchronization signal block #3 713 are mapped, and then synchronization signal block #0 720, synchronization signal block #1 721, synchronization signal block #2 722, and synchronization signal block #3 723 are mapped in a circulating manner. In this regard, when the BS could not access the unlicensed band before the BS transmits synchronization signal block #0 710, but the BS accesses the unlicensed band before the BS transmits synchronization signal block #1 711, the BS may transmit synchronization signal block #1 711, synchronization signal block #2 712, synchronization signal block #3 713, and synchronization signal block #0 720. In other words, in SMTC-U duration, an opportunity to transmit a configured RLM-RS is increased, compared to that of SMTC, and thus, the UE may further efficiently perform a RLM operation. Because, in SMTC-U duration, the BS performs a channel access procedure during a short fixed time such as Type 2 channel access procedure or transmits a RLM-RS without separately performing a channel access procedure such as Type 3 channel access procedure, a probability that a configured RLM-RS is transmittable in the SMTC-U duration 700 may be greater than a probability that the configured RLM-RS is transmittable in SMTC duration 765. Therefore, the UE in which SMTC-U is configured may perform RLM by using all (e.g., Embodiment 1) or some (e.g., Embodiment 2) of candidates (SSB #0 710, SSB #1 711, SSB #0 720, SSB #1 721, SSB #0 730, SSB #1 731, SSB #0 740, SSB #1 741, SSB #0 750, and SSB #1 751) where a configured RLM-RS is transmittable in SMTC-U. In this regard, in SMTC duration 765, RLM may be performed by using only configured RLM-RSs in SMTC.

Therefore, it is possible to apply a reference of an RLM operation to SMTC-U and SMTC differently. For example, for RLM in SMTC-U, as in Embodiment 1, the UE may perform the RLM by using all of the candidates (SSB #0 710, SSB #1 711, SSB #0 720, SSB #1 721, SSB #0 730, SSB #1 731, SSB #0 740, SSB #1 741, SSB #0 750, and SSB #1 751) where the configured RLM-RS is transmittable in the SMTC-U, regardless of whether the configured RLM-RS has been actually transmitted in the SMTC-U. In other words, when OOS occurs in all candidates in which the configured RLM-RS is transmittable in the SMTC-U, the UE may determine the OOS and thus may indicate or transmit OOS occurrence to an upper layer. In this regard, when IS occurs in any one of the candidates in which the configured RLM-RS is transmittable in the SMTC-U, the UE may determine the IS and thus may indicate or transmit IS occurrence to the upper layer.

For RLM in the SMTC duration 765, as in Embodiment 2, the UE may perform RLM by using a RLM-RS with respect to a configured RLM-RS in the SMTC duration 765, the RLM-RS being determined to have been actually transmitted. In other words, when the UE determines that all of configured RLM-RSs have not been transmitted in the SMTC duration 765, the UE may not perform a RLM operation in the SMTC duration 765. In other words, when the UE determines that all of the configured RLM-RSs have not been transmitted in the SMTC duration 765, the UE does not determine IS or OOS in the SMTC duration 765, nor uses a determined IS or OOS result, nor indicates or transmits the determined IS or OOS result to the upper layer.

In the descriptions above, it is assumed that the UE differently applies a method or reference for performing RLM by using a RLM-RS from a serving cell to SMTC-U and SMTC, but it is possible to equally perform the RLM in SMTC-U and SMTC. For example, when the UE determines that RLM-RSs are not transmitted from all candidate domains in which a configured RLM-RS is transmittable in SMTC-U or SMTC, the UE may determine OOS and thus may indicate or transmit OOS occurrence to an upper layer. In this regard, when the UE determines that RLM-RSs are not transmitted from all candidate domains in which the configured RLM-RS is transmittable in SMTC-U or SMTC, the UE may not perform an RLM operation. In other words, in the aforementioned descriptions, the UE may not determine IS or OOS in the SMTC-U or SMTC, or even when the UE determines IS or OOS, the UE may not perform indication or transmission with respect to IS or OOS to the upper layer. For example, when the UE determines that a configured RLM-RS has been transmitted from at least one of candidate domains in which the configured RLM-RS is transmittable in the SMTC-U or SMTC, performs RLM thereon and thus determines OOS, the UE may indicate or transmit OOS occurrence to an upper layer. For example, when the UE determines that all configured RLM-RSs have been transmitted from one or more candidate domains in which a configured RLM-RS is transmittable in the SMTC-U or SMTC, performs RLM thereon and thus determines that OOS has occurred with respect to all configured RLM-RSs, the UE may indicate or transmit OOS occurrence to the upper layer. When the UE determines that a configured RLM-RS has been transmitted from at least one of candidate domains in which the configured RLM-RS is transmittable in the SMTC-U or SMTC, performs RLM thereon and thus determines IS, the UE may indicate or transmit IS occurrence to the upper layer. For example, when the UE determines that all configured RLM-RSs have been transmitted from one or more candidate domains in which a configured RLM-RS is transmittable in the SMTC-U or SMTC, performs RLM thereon and thus determines IS with respect to all configured RLM-RSs, the UE may indicate or transmit IS occurrence to the upper layer.

Here, the UE may determine that the configured RLM-RS has been actually transmitted in the SMTC-U or SMTC, by using methods below.

Method A: In a case where the configured RLM-RS is a synchronization signal block, the UE may determine that the RLM-RS has been transmitted when at least one of signals is detected, the signals including PSS, SSS, PBCH, and DMRS of PBCH with respect to the synchronization signal block configured as the RLM-RS. In this regard, the UE may determine that the RLM-RS has been transmitted when at least one of values including magnitude, an SNR, and a correlation value of a reception signal is greater than a predefined threshold value or a threshold value configured by an upper signal, the reception signal being with respect to at least one of signals including PSS, SSS, PBCH, and DMRS of PBC with respect to the synchronization signal block configured as the RLM-RS. In a case where a CSI-RS is configured as the RLM-RS, when a signal with respect to the CSI-RS configured as the RLM-RS is detected or at least one of values including magnitude, an SNR, and a correlation value of a reception signal with respect to the CSI-RS is greater than the predefined threshold value or the threshold value configured by the upper signal, the UE may determine that the RLM-RS has been transmitted. In this regard, in addition to reference values (Qout, Qin) configured for determining IS or OOS in a RLM process, the UE may be configured with respect to a reference value (e.g., Qrx) for determining whether a RLM-RS has been transmitted. Here, the reference value (e.g., Qrx) may be configured through an upper signal separate from the reference values (Qout, Qin) configured for determining IS or OOS, or a pair (Qout, Qin and Qrx) may be configured.

Method B: As another method, when the UE receives SFI information about SMTC-U or SMTC transmission duration or a slot or a symbol at which RLM-RS transmission is configured in the SMTC-U or SMTC transmission duration, and when the SFI information indicates that the slot or the symbol at which RLM-RS transmission is configured is a DL symbol, the UE may determine that the RLM-RS has been transmitted. Even when the SFI information indicates that the slot or the symbol at which RLM-RS transmission is configured is a flexible symbol, the UE may determine that the RLM-RS has been transmitted. In this regard, the UE may differently determine, according to the SMTC-U or SMTC transmission duration, whether a RLM-RS has been actually transmitted, with respect to the RLM-RS indicated using a flexible symbol. For example, in a case of the SMTC-U transmission duration, when the SFI information indicates that the slot or the symbol at which RLM-RS transmission is configured is the flexible symbol, the UE may determine that the RLM-RS has been transmitted. In a case of the SMTC transmission duration, when the SFI information indicates that the slot or the symbol at which RLM-RS transmission is configured is the flexible symbol, the UE may determine that the RLM-RS has not been transmitted or may determine, based on additional determination using Method B, whether the RLM-RS has been transmitted. This is because only a synchronization signal block or a CSI-RS can be transmitted without additional transmission of SFI information in the SMTC-U transmission duration. In this regard, the UE receives not only the SFI information but also receives DCI for scheduling PDSCH reception with respect to the slot or the symbol at which RLM-RS transmission is configured, and thus may determine that the RLM-RS has been actually transmitted even when the UE determines that the slot or the symbol at which RLM-RS transmission is configured is a DL symbol. When the UE receives DCI for scheduling or indicating a UL signal or channel (PUSCH/PUCCH/PRACH/SRS) transmission with respect to the slot or the symbol at which RLM-RS transmission is configured, the UE may determine that the slot or the symbol at which RLM-RS transmission is configured is a UL symbol and thus may determine that the RLM-RS has not been transmitted.

When a plurality of RLM-RSs are detected, the UE may determine, as a valid RLM-RS, a RLM-RS of which reception signal strength (or a SNR or a SINR) is largest from among the plurality of detected RLM-RSs, and may perform a RLM operation by using the RLM-RS determined to be valid. In this regard, even when the plurality of RLM-RSs are detected, the UE may receive a PBCH or an SIB with respect to a RLM-RS and thus may identify the RLM-RS from among the plurality of RLM-RSs, the RLM-RS being configured as a RLM-RS. For example, when a plurality of cells each transmit a RLM-RS configured as a RLM-RS to the UE, the UE having received the plurality of RLM-RSs may receive and decode at least one of a PBCH for a synchronization signal block or an SIB connected to the synchronization signal block, and may perform RLM by using a RLM-RS from a serving cell that is a cell on which the RLM is to be performed, the RLM-RS being from among the plurality of RLM-RSs.

Embodiment 4

Hereinafter, the present disclosure provides a method of configuring an RLM-RS between the BS and the UE operating in the unlicensed band, and a method, performed by the UE, of determining a valid RLM-RS.

The UE may be configured, through an upper signal, to perform RLM by using at least one signal of a synchronization signal block or a CSI-RS. In this regard, the UE may monitor a state or quality of a DL radio link with the BS in a configured RLM-RS time, at a G frequency resource. Detailed descriptions are provided below with reference to an example in which the UE is configured for a synchronization signal block as an RLM-RS. The UE may obtain index information of the synchronization signal block to be used as the RLM-RS from SSB-ToMeasure information of SSB-ConfigMobility of an upper signal. In this regard, the SSB-ToMeasure information may be bitmap information indicating a synchronization signal block index, and a bit number may vary according to a frequency band to be measured. For example, for a frequency band of 5 GHZ, the synchronization signal block to be used as the RLM-RS may be configured through an 8-bit bitmap.

```
SSB-ConfigMobility::=        SEQUENCE {
    ssb-ToMeasure                SetupRelease { SSB-ToMeasure }  OPTIONAL,  --
Need M
    deriveSSB-IndexFromCell      BOOLEAN,
    ss-RSSI-Measurement                   SS-RSSI-Measurement  OPTIONAL,  -- Need M
    ...
}
SSB-ToMeasure ::=            CHOICE {
    shortBitmap                  BIT STRING (SIZE (4)),
    mediumBitmap                 BIT STRING (SIZE (8)),
    longBitmap                   BIT STRING (SIZE (64))
}
```

When the synchronization signal block is used as the RLM-RS, the UE may receive and determine configuration information about a time to perform an RLM operation (SMTC) by using the RLM-RS, through SSB-MTC of the upper signal from the BS. For example, the SSB-MTC may be composed of an SMTC period, a subframe offset (or information indicating an SMTC start subframe), and SMTC duration or length information. The UE may determine, based on period, offset, and duration information, SMTC duration configured by the BS so as to perform RLM, and may perform the RLM operation by using the RLM-RS configured for the SMTC duration.

This process is described below with reference to FIG. 6.

The BS may configure, as a RLM-RS, synchronization signal block #0 660 and synchronization signal block #1 661 to the UE by using bitmap information of the SSB-ToMeasure information of the upper signal. In addition, the BS may configure, by using the SSB-MTC of the upper signal, RLM operation duration to the UE through information of an SMTC period 680, offset (that is 0 in a case of FIG. 6), and duration 660.

When the BS and the UE perform RLM by using a RLM-RS transmitted through the unlicensed band, the BS may not be able to transmit the RLM-RS within a configured time due to a failure of a channel access procedure. In this regard, the UE cannot correctly measure a radio link quality by using the RLM-RS, may receive a RLM-RS from an adjacent cell or an adjacent operator, not from a serving cell, may incorrectly measure a radio link quality by measuring a radio link quality by using signals from different systems, or may determine a quality of the RLM-RS or a value of a reception SNR to be very low. Due to that, the UE may perform an incorrect RLM operation by measuring a radio link quality that is not an actual radio link quality or by determining a radio link quality to be an OOS state, even when the actual radio link quality is good. To solve this problem, in the present embodiment of the disclosure, an evaluation time used to evaluate a quality of a radio link with a serving cell, and at least one of a constant or timers (N310, N311, and T310) used to determine a RLF may be differently configured in a case in which the UE performs RLM on a serving cell that operations in the unlicensed band and a case in which the UE performs RLM on a serving cell that operates in a licensed band. By doing so, the UE may further efficiently perform a RLM operation on the serving cell in the unlicensed band.

For example, in a case where the UE performs RLM on the serving cell that operates in the licensed band, when occurrence of N310 consecutive OOSs is indicated through an upper layer, the UE may operate a timer corresponding to a value of T310. When the timer stops, the UE may determine a RLF and may transit to an idle mode state (RRC_IDLE) or may perform a new link finding operation by performing an operation of searching for a new radio link, e.g., an initial access process. While the T310 timer operates, when occurrence of N311 consecutive ISs is indicated through the upper layer, the UE may stop the T310 timer.

When RLM is performed on the serving cell that operates in the unlicensed band, the BS may not be able to transmit a RLM-RS according to a channel access procedure result of the BS. In other words, a case in which a RLM-RS cannot be transmitted may frequently occur, compared to a case in which RLM is performed on the serving in the licensed band. Even when the BS did not actually transmit a RLM-RS but the UE measures a configured RLM-RS, OOS may occur but the OOS is not OOS that is caused due to deterioration in a quality of an actual radio link. Therefore, even when N310 consecutive OOSs occurred, the OOSs may not be OOSs that are caused due to deterioration in a quality of an actual radio link. When RLM is performed on the serving cell that operates in the unlicensed band, to prevent a RLF from occurring due to the aforementioned cause, a value of N310 for the serving cell operating in the unlicensed band may be set to be greater than a value of N310 for the serving cell operating in the licensed band. On the other hand, a case in which a RLM-RS is attempted to be transmitted but cannot be transmitted in the unlicensed band may frequently occur, compared to a case in which RLM is performed on the serving cell in the licensed band. In other words, when RLM is performed on the serving cell operating in the unlicensed band, it may be more difficult for the UE to obtain N311 consecutive ISs, compared to RLM in the licensed band. Therefore, a value of N311 with respect to the serving cell operating in the unlicensed band is set to be smaller than a value of N310 with respect to the serving cell operating in the licensed band, such that an unnecessary RLF (or a stop of the T310 timer) may be minimized.

Similarly, with respect to the case in which RLM is performed on the serving cell operating in the unlicensed band and the case in which RLM is performed on the serving cell operating in the licensed band, an evaluation time of measuring a quality of a radio link by performing RLM may be differently configured for the UE as below. In general, a channel access procedure is requested in the unlicensed band, and thus it may require a more time to transmit a same number of RLM-RSs. Therefore, an evaluation time of the UE for measuring a quality of a radio link by performing RLM on the serving cell that operates in the unlicensed band may be set to be longer than an evaluation time of the UE for measuring a quality of a radio link by performing RLM on the serving cell that operates in the licensed band. That is, in Table 5 below, A, B, C, D, E, and F values may be integers that satisfy A>200, B>100, C>10, D>15, E>7.5, and F>5. In this regard, in Table 5 below, at least one of A, B, C, D, E, and F values may be set to be longer than the evaluation time of the UE for measuring the quality of the radio link by performing RLM on the serving cell that operates in the licensed band.

FIG. 7B is a diagram for describing an RLM method, according to an embodiment. Referring to FIG. 7B, an SSB (e.g. 710) is transmitted in a SMTC-U (700) for an RLM. The SSB, for example, is not utilized as an RLM-RS outside of the SMTC-U (700).

FIG. 7C is a diagram for describing an RLM method, according to an embodiment.

Referring to FIG. 7C, an SSB (e.g. 710) is transmitted in an SMTC-U (700) for an RLM. The other type of RLM-RS (781, e.g. CSI-RS) than SSB may be used for the RLM, outside of the SMTC-U (700). However, this is merely an example, and for the RLM, the SSB may be used outside of the SMTC-U (700).

TABLE 5

| Configuration | $T_{Evaluate\_out}$ (ms) | $T_{Evaluate\_in}$ (ms) |
| --- | --- | --- |
| Non-DRX | Max(A, ceil(C*P)*$T_{SSB-U}$) | Max(B, ceil(C*P)*$T_{SSB-U}$) |
| DRX cycle <= 320 | Max(A, ceil(D*P)*max($T_{DRX}$, $T_{SSB-U}$)) | Max(A, ceil(E*P)*max($T_{DRX-U}$, $T_{SSB-U}$)) |
| DRX cycle > 320 | ceil(C*P)*$T_{DRX-U}$ | ceil(F*P)*$T_{DRX-U}$ |

Note:
$T_{SSB-U}$ is the periodicity of SSB configured for RLM in unlicensed spectrum.
$T_{DRX-U}$ is the DRX cycle length for unlicensed spectrum FIG. 8 is a flowchart of a method of a BS, according to an embodiment.

Figure 8:
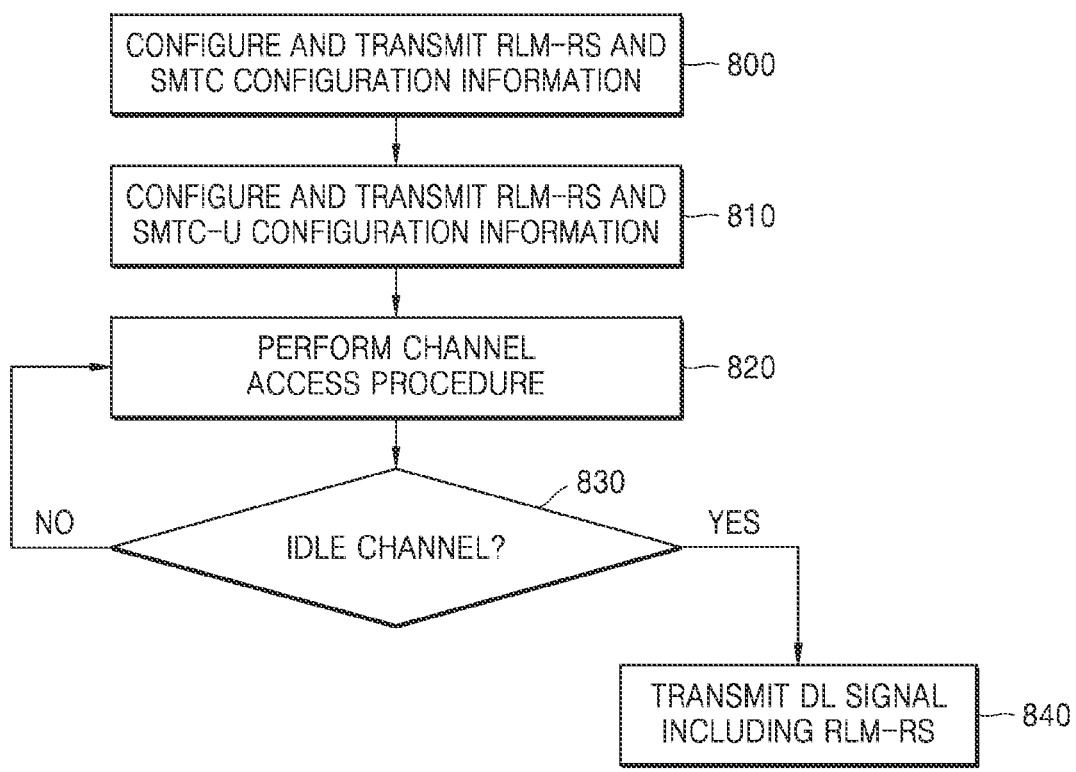
FIG. 8 is a flowchart of a method of a base station (BS), according to an embodiment.

Referring to FIG. 8, in step 800, the BS may configure RLM-RS configuration information with respect to a RLM-RS to be used by the UE to perform RLM on a serving cell and SMTC configuration information including time domain information with respect to performing RLM, and may transmit the RLM-RS configuration information and the SMTC configuration information to the UE through an upper signal. In this regard, a synchronization signal block or a CSI-RS may be configured to be used as the RLM-RS, or both the synchronization signal block and the CSI-RS may be configured to be used as the RLM-RS. The SMTC configuration information includes periodicity by which the UE performs RLM by using the RLM-RS, offset information, and SMTC duration or length information. In step 800, to include a case in which a serving cell is an unlicensed band serving cell, the BS may additionally configure RLM-RS configuration information with respect to a RLM-RS to be used by the UE to perform RLM on the serving cell operating in a unlicensed band, and SMTC-U configuration information including time domain information with respect to performing RLM, and may transmit the RLM-RS configuration information and the SMTC-U configuration information to the UE through an upper signal. In this regard, a synchronization signal block or a CSI-RS may be configured to be used as the RLM-RS, or both the synchronization signal block and the CSI-RS may be configured to be used as the RLM-RS, and the SMTC-U configuration information y include periodicity by which the UE performs RLM by using the RLM-RS, offset information, and SMTC-U duration or length information. When the UE performs RLM on the serving cell that operates in the unlicensed band, the BS may transmit the RLM-RS configuration information and the SMTC-U configuration information by performing step 810, without step 800. In step 810, the BS may configure and transmit SMTC-U configuration information and RLM-RS configuration information.

In step 820, the BS may perform a channel access procedure in an unlicensed band through which the BS attempts to transmit a signal. When it is determined that the unlicensed band is in an idle state in step 830, the BS may transmit a DL signal including an RLM-RS in step 840. When it is determined that the unlicensed band is not in the idle state in step 830, the BS continues the channel access procedure in step 820.

Figure 9:
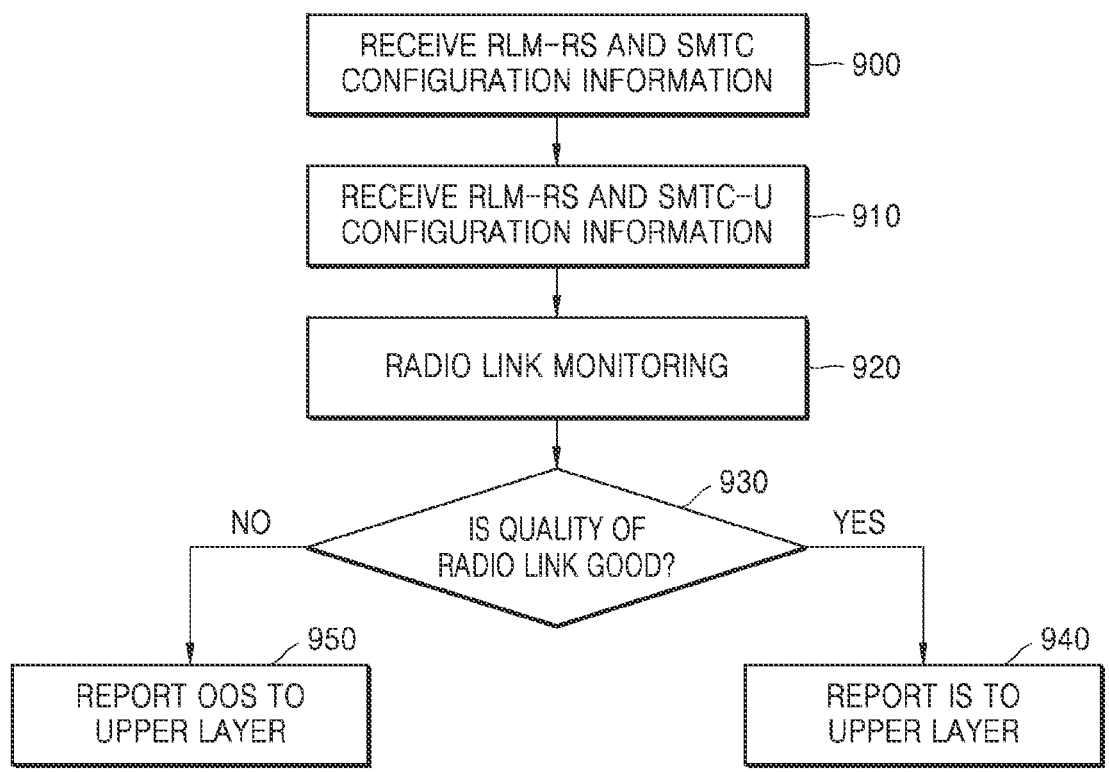
FIG. 9 is a flowchart of a method of a user equipment (UE), according to an embodiment.

FIG. 9 is a flowchart of a method of a UE, according to an embodiment.

Referring to FIG. 9, in step 900, the UE may receive, from the BS, a RLM-RS to be used by the UE to perform RLM on a serving cell and SMTC configuration information including time domain information with respect to performing RLM, and may configure or determine SMTC based on the received information. In this regard, a synchronization signal block or a CSI-RS may be configured to be used as the RLM-RS, or both the synchronization signal block and the CSI-RS may be configured to be used as the RLM-RS. The SMTC configuration information may include periodicity by which the UE performs RLM by using the RLM-RS, offset information, and SMTC duration or length information. When the UE receives the SMTC configuration information, the UE may determine a position of a first subframe of each SMTC according to Equation (2) below.

$$SFN \bmod T = (FLOOR(Offset/10)) \ldots \quad (2)$$

When periodicity (T)>5 subframe, subframe=Offset mod 10;

otherwise, subframe=Offset or (Offset+5)

where, T=CEIL(Periodicity/10).

In step 900, the UE may additionally receive a RLM-RS to be used by the UE to perform RLM on a serving cell operating in an unlicensed band, and SMTC-U configuration information including time domain information with respect to performing RLM so as to include a case in which the serving cell is an unlicensed band serving cell. In this regard, a synchronization signal block or a CSI-RS may be configured to be used as the RLM-RS, or both the synchronization signal block and the CSI-RS may be configured to be used as the RLM-RS, and the SMTC-U configuration information may include periodicity by which the UE performs RLM by using the RLM-RS, offset information, and SMTC-U duration or length information. A method of determining a position of a first subframe of SMTC-U, the method being performed by the UE having received the SMTC-U configuration information, may be equal to the aforementioned method. When the UE performs RLM on the serving cell operating in the unlicensed band, the UE may receive only the RLM-RS and the SMTC-U configuration information by performing step 910, without step 900. After the UE is configured with respect to the RLM-RS, SMTC, and SMTC-U in steps 900 and 910, the UE may perform RLM according to various embodiments of the present disclosure by using a configured time domain and a configured signal in step 920. When a RLM-RS is detected in step 920, the UE may measure a quality of a radio link by using the detected RLM-RS, and in step 930, when the UE determines that the measured quality of the radio link is superior than a predetermined criteria (e.g., amplitude of power of detected RLM-RS is greater than a threshold value), the UE may report IS to an upper layer in step 940. In step 930, when the measured quality of the radio link is inferior to a predetermined criteria (e.g., amplitude of power of detected RLM-RS is less than the threshold value), the UE may report OOS to the upper layer in step 950. In step 920, when the UE determines that the RLM-RS is not detected, the UE may perform a next RLM without determining IS or OOS, or may report OOS to the upper layer in step 950. In this regard, step 920 may be skipped.

Figure 10:
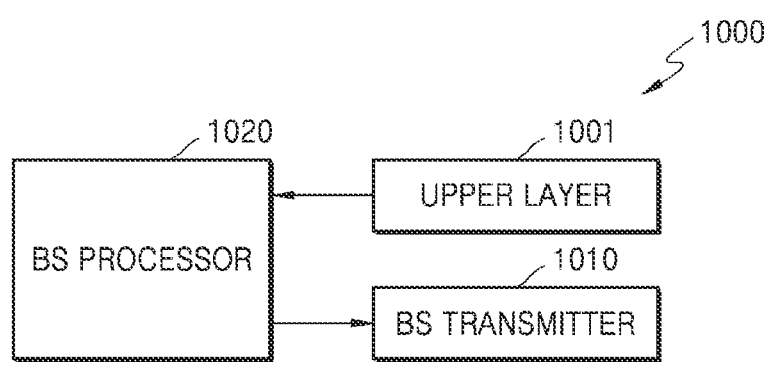
FIG. 10 is a block diagram of a BS, according to an embodiment.

FIG. 10 is a block diagram of a BS 1000, according to an embodiment.

Referring to FIG. 10, the BS 1000 may include a BS receiver (e.g., an upper layer) 1001, a BS transmitter 1010, and a BS processor 1020. The BS receiver 1001, the BS transmitter 1010, and the BS processor 1020 may operate based on the aforementioned BS communication method. However, elements of the BS 1000 are not limited to the aforementioned example. The BS 1000 may include more elements than the aforementioned elements or may include fewer elements than the aforementioned elements. For example, the BS receiver 1001 and the BS transmitter 1010 may be implemented as a transceiver. For example, the BS 1000 may further include a memory. In addition, in the BS 1000, a processor, the transceiver, and the memory may be integrated to one integrated circuit or chip. At least one processor may be included. The processor may be used as an equivalent of the BS processor 1020.

The transceiver collectively refers to the BS receiver 1001 and the BS transmitter 1010, and may transmit and receive signals to and from a UE. The signals transmitted to or received from the UE may include control information and data. The transceiver may include a radio frequency (RF) transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto. The transceiver may receive a signal through a wireless channel and output the signal to the BS processor 1020, and may transmit a signal output from the BS processor 1020, through a wireless channel.

The BS processor 1020 may control a series of procedures to operate the BS 1000 according to the afore-described embodiments of the present disclosure. For example, the transceiver may receive a data signal including a control signal, which is transmitted from the UE, and the BS processor 1020 may determine a result of receiving the control signal and the data signal transmitted from the UE. In addition, the BS processor 1020 may perform a channel access procedure on an unlicensed band. For example, the transceiver may receive a signal transmitted via the unlicensed band, and the BS processor 1020 may determine whether the unlicensed band is in an idle state, by comparing a strength of the received signal with a threshold value that is pre-defined or is determined as a result value of a function using a bandwidth or the like as a factor. In addition, the BS processor 1020 may maintain or change a value of a contention period for the channel access procedure, based on a received data signal reception result of the UE. When it is determined that the unlicensed band is in the idle state, the BS processor 1020 may control the transceiver to transmit a DL signal including SFI information. In this regard, the transceiver may transmit, to the UE, the DL signal including information about UL or DL transmission duration within a COT of the unlicensed band, the COT being determined by the BS processor 1020. In addition, the BS processor 1020 may receive a PUSCH, which is transmitted by the UE, in a PUSCH transmission resource region determined based on the SFI information and PDSCH/PUSCH scheduling information.

In addition, the BS processor 1020 may configure an RLM-RS to be used by the UE to measure a quality of a radio link with a serving cell, and SMTC configuration information including time information with respect to performing measurement of a radio link quality, and the transceiver may transmit the RLM-RS and the SMTC configuration information to the UE. When the serving cell is a serving cell that operates in the unlicensed band, the BS processor 1020 may configure a RLM-RS to be used by the UE to measure a quality of a radio link with an unlicensed band cell, and SMTC-U configuration information including time information with respect to performing measurement of a radio link quality, and the transceiver may transmit the RLM-RS and the SMTC-U configuration information to the UE. That is, the BS processor 1020 may control other elements of the BS 1000 to perform transmission of an upper signal, transmission of an SFI, transmission of DCI, transmission of the control signal, the channel access procedure, or the like.

In addition, the BS processor 1020 may control the transceiver and the memory to transmit PDCCH configuration information to the UE by executing a program stored in the memory so as to indicate a COT, to perform a channel access procedure to occupy a channel in the unlicensed band, and to provide SFI information about at least one slot within a COT occupied by performing the channel access procedure. In addition, the BS processor 1020 may control other elements of the BS 1000 to perform the afore-described method of indicating a COT.

The memory may store a program and data for performing the above-described operation of the BS 1000. In addition, the memory may store control information or data included in a signal obtained by the BS 1000. The memory may be implemented as a storage medium including a read only memory (ROM), a random access memory (RAM), a hard disk, a compact disc (CD)-ROM, a digital versatile disc (DVD), or the like, or any combination thereof.

Figure 11:
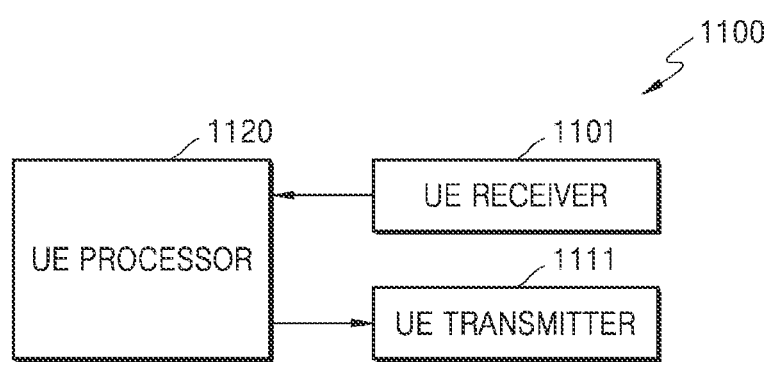
FIG. 11 is a block diagram of a UE, according to an embodiment.

FIG. 11 is a block diagram of a UE 1100, according to an embodiment.

Referring to FIG. 11, the UE 1100 may include a UE receiver 1101, a UE transmitter 1110, and a UE processor 1120. The UE receiver 1101, the UE transmitter 1110, and the UE processor 1120 may operate based on the aforementioned UE communication method. However, elements of the UE 1100 are not limited to the aforementioned example. The UE 1100 may include more elements than the aforementioned elements or may include fewer elements than the aforementioned elements. For example, the UE receiver 1101 and the UE transmitter 1110 may be implemented as a transceiver. For example, the UE 1100 may further include a memory. In addition, in the UE 1100, a processor, the transceiver, and the memory may be integrated to one chip. At least one processor may be included. The processor may be used as an equivalent of the UE processor 1120.

The transceiver collectively refers to the UE receiver 1101 and the UE transmitter 1110, and may transmit and receive signals to and from a BS. The signals transmitted to or received from the UE 1100 may include control information and data. To this end, the transceiver may include a RF transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto.

The transceiver may receive a signal through a wireless channel and output the signal to the UE processor 1120, and may transmit a signal output from the UE processor 1120, through a wireless channel. The UE processor 1120 may control a series of procedures to operate the UE 1100 according to the afore-described embodiments of the present disclosure. For example, the transceiver may receive a data signal including a control signal, and the UE processor 1120 may determine a result of receiving the data signal. Afterward, in a case where the UE 1100 is required to transmit, to the BS, a first signal reception result including reception of data at the timing, the transceiver transmits the first signal reception result to the BS at a timing determined by the UE processor 1120. In addition, when the transceiver receives, from the BS, information about UL or DL transmission duration in channel occupancy duration of the unlicensed band, the UE processor 1120 may re-configure or change a DL control channel transmission time or duration of the UE 1100, or the UE 1100 may re-configure or change time domain assignment information of a scheduled UL data channel, such that the UE receiver 1101 may receive a DL control channel transmitted by the BS. In addition, the UE processor 1120 may receive, from the BS, a reception result with respect to UL data transmitted by the transceiver, and the UE processor 1120 may maintain or change a size of a contention period used in a channel access procedure for signal transmission in an unlicensed band, based on the received reception result. In addition, the UE processor 1120 may obtain SFI information transmitted from the BS, and the UE processor 1120 may re-configure or change time domain assignment information of a scheduled UL data channel, based on the received SFI information.

In addition, the UE processor 1120 may perform a series of operations for receiving, from the BS, configuration of slot format information (e.g., the SFI information, the slot format information, and a plurality of pieces of additional information such as offset information and valid slot information, and obtaining the slot format information, based on the received information. That is, the UE processor 1120 may control other elements of the UE 1100 to perform reception of an upper signal, reception of an SFI, reception of DCI, the channel access procedure, or the like.

In addition, the UE processor 1120 may receive, from the BS, at least one of a plurality of pieces of configuration information including a RLM-RS, SMTC, and SMTC-U. In addition, the UE processor 1120 may measure and determine a quality of a radio link with a serving cell, based on a RLM-RS received by the transceiver, the RLM-RS being configured in SMTC or SMTC-U configuration information according to an embodiment of the present disclosure, may determine whether the radio link with the serving cell is IS or OOS, and may indicate or transmit a result of the determination to an upper layer.

In addition, the UE processor 1120 may control the transceiver and the memory to receive a PDCCH from the BS based on PDCCH configuration information by executing a program stored in the memory so as to obtain COT information, to obtain SFI information in the received PDCCH, and to determine at least one of a MCOT of the BS or a COT, based on the SFI information. In addition, the UE processor 1120 may control other elements of the UE 1100 to perform the afore-described method of obtaining the COT information.

The memory may store the program and data necessary for operations of the UE 1100. In addition, the memory may store control signal or data included in a signal obtained by the UE 1100. The memory may be implemented as a storage medium including a ROM, a RAM, a hard disk, a CD-ROM, a DVD, or the like, or any combination thereof.

The methods according to the embodiments of the present disclosure as described herein or in the appended claims may be implemented as hardware, software, or a combination of hardware and software.

When implemented as software, a non-transitory computer-readable storage medium storing one or more programs (e.g., software modules) may be provided. The one or more programs stored in the non-transitory computer-readable storage medium are configured for execution by one or more processors in an electronic device. The one or more programs include instructions directing the electronic device to execute the methods according to the embodiments of the present disclosure as described herein or in the appended claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the present disclosure, an element or elements included in the present disclosure are expressed in a singular or plural form depending on the described embodiments of the present disclosure. However, the singular or plural form is selected appropriately for a situation assumed for convenience of description, but the present disclosure is not limited to the singular or plural form, and an element expressed in a singular form may include a plurality of elements and elements expressed in a plural form may include a single element.

According to the embodiments of the present disclosure, it is possible to efficiently provide a service in a wireless communication system.

It should be understood that the present disclosure and the accompanying drawings should be considered in a descriptive sense only and not for purposes of limitation. That is, it will be understood by one of ordinary skill in the art that various changes in form and details may be made based on the present disclosure. In addition, the embodiments of the present disclosure may be combined to be implemented, when required. For example, portions of the methods provided by the present disclosure may be combined with each other to enable a BS and a UE to operate. In addition, although the embodiments of the present disclosure are described based on 5G and NR systems, modifications based on the present disclosure may be applied to other communication systems such as LTE, LTE-A, LTE-A-Pro systems, or the like.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A method performed by a user equipment (UE), the method comprising:
    receiving radio link monitoring (RLM) configuration information from a base station;
    identifying a synchronization signal block (SSB) index included in the RLM configuration information;
    identifying, in an RLM-reference signal (RS) transmission duration, at least one candidate synchronization signal/physical broadcast channel (SS/PBCH) block circularly mapped on the SSB index, based on an index of the at least one candidate SS/PBCH block corresponding to the SSB index included in the RLM configuration information received from the base station and a number of SSB identified according to subcarrier spacing; and
    performing RLM based on the at least one identified candidate SS/PBCH block.

2. The method of claim 1, wherein performing the RLM comprises:
    in case that a plurality of candidate SS/PBCH blocks are identified, performing the RLM based on the plurality of candidate SS/PBCH blocks.

3. The method of claim 1, wherein performing the RLM comprises:
    in case that a plurality of candidate SS/PBCH blocks are identified, performing the RLM based on one of the plurality of candidate SS/PBCH blocks.

4. The method of claim 1, wherein performing of the RLM comprises:
    detecting an SS/PBCH block transmitted from among the at least one candidate SS/PBCH block; and
    performing the RLM based on the detected SS/PBCH block.

5. The method of claim 1, wherein performing the RLM comprises:
    identifying a first threshold value for out of synchronization (OOS) evaluation and a second threshold value for in synchronization (IS) evaluation based on the RLM configuration information; and
    performing the OOS evaluation based on the first threshold or the IS evaluation based on the second threshold.

6. A method performed by a base station, the method comprising:
    obtaining radio link monitoring (RLM) configuration information including a synchronization signal block (SSB) index;
    transmitting the RLM configuration information; and
    transmitting a plurality of candidate synchronization signal/physical broadcast channel (SS/PBCH) blocks, in a configured RLM-reference signal (RS) transmission duration through an unlicensed band,
    wherein the plurality of candidate SS/PBCH blocks are circularly mapped on the SSB index, based on an index of the plurality of candidate SS/PBCH blocks corresponding to the SSB index included in the RLM configuration information received from the base station and a number of SSB identified according to subcarrier spacing, and wherein RLM is performed based on at least one candidate SS/PBCH block identified at a user equipment among the plurality of candidate SS/PBCH blocks.

7. The method of claim 6, wherein the RLM is performed using a plurality of identified candidate SS/PBCH blocks.

8. The method of claim 6, wherein the RLM is performed using one of a plurality of identified candidate SS/PBCH blocks.

9. A user equipment (UE), the UE comprising:

a transceiver; and a processor configured to:

receive, via the transceiver, radio link monitoring (RLM) configuration information from a base station, identify a synchronization signal block (SSB) index included in the RLM configuration information, identify, in an RLM-reference signal (RS) transmission duration, at least one candidate synchronization signal/ physical broadcast channel (SS/PBCH) block circularly mapped on the SSB index, based on an index of the at least one candidate SS/PBCH block corresponding to the SSB index included in the RLM configuration information received from the base station and a number of SSB identified according to subcarrier spacing, and perform RLM based on the at least one identified candidate SS/PBCH block.

10. The UE of claim 9, wherein the processor is further configured to perform the RLM based on a plurality of candidate SS/PBCH blocks, in case that the plurality of candidate SS/PBCH blocks are identified.

11. The UE of claim 9, wherein the processor is further configured to perform the RLM based on one of a plurality of candidate SS/PBCH blocks, in case that the plurality of candidate SS/PBCH blocks are identified.

12. The UE of claim 9, wherein the processor is further configured to:

detect an SS/PBCH block transmitted from among the at least one candidate SS/PBCH block, and perform the RLM based on the detected SS/PBCH block.

13. The UE of claim 9, wherein the processor is further configured to:

identify a first threshold value for out of synchronization (OOS) evaluation and a second threshold value for in synchronization (IS) evaluation based on the RLM configuration information, and perform the OOS evaluation based on the first threshold or the IS evaluation based on the second threshold.

14. A base station for performing radio link monitoring (RLM) in a wireless communication system, the base station comprising:

a transceiver; and a processor configured to:

obtain radio link monitoring (RLM) configuration information including a synchronization signal block (SSB) index, transmit, via the transceiver, the RLM configuration information, and transmit, via the transceiver, a plurality of candidate synchronization signal/physical broadcast channel (SS/ PBCH) blocks, in a configured RLM-reference signal (RS) transmission duration through an unlicensed band, wherein the plurality of candidate SS/PBCH blocks are circularly mapped on the SSB index, based on an index of the plurality of candidate SS/PBCH blocks corresponding to the SSB index included in the RLM configuration information received from the base station and a number of SSB identified according to subcarrier spacing, and wherein RLM is performed based on at least one candidate SS/PBCH block identified at a user equipment among the plurality of candidate SS/PBCH blocks.

15. The base station of claim 14, wherein the RLM is performed using a plurality of identified candidate SS/PBCH blocks.

16. The base station of claim 14, wherein the RLM is performed using one of a plurality of identified candidate SS/PBCH blocks.

* * * * *